US012621526B2

(12) United States Patent
Seo et al.

(10) Patent No.: US 12,621,526 B2
(45) Date of Patent: May 5, 2026

(54) ELECTRONIC APPARATUS AND METHOD OF CONTROLLING THE SAME

(71) Applicants: SAMSUNG ELECTRONICS CO., LTD., Suwon-si (KR); UNIST (ULSAN NATIONAL INSTITUTE OF SCIENCE AND TECHNOLOGY), Ulsan (KR)

(72) Inventors: Guiwon Seo, Suwon-si (KR); Jonghwan Kim, Suwon-si (KR); Youngshin Kwak, Suwon-si (KR); Youngsu Moon, Suwon-si (KR); Sungwon Seo, Suwon-si (KR); Younghoon Jeong, Suwon-si (KR); Minjeong Ko, Seogwipo-si (KR); Yeseul Baek, Ulsan (KR)

(73) Assignees: SAMSUNG ELECTRONICS CO., LTD., Suwon-si (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 0 days.

(21) Appl. No.: 18/308,335

(22) Filed: Apr. 27, 2023

(65) Prior Publication Data

US 2023/0269430 A1 Aug. 24, 2023

Related U.S. Application Data

(63) Continuation of application No. PCT/KR2021/015002, filed on Oct. 25, 2021.

(30) Foreign Application Priority Data

Oct. 27, 2020 (KR) ........................ 10-2020-0139962

(51) Int. Cl.
*H04N 21/462* (2011.01)
*H04N 21/44* (2011.01)
(Continued)

(52) U.S. Cl.
CPC ........... *H04N 21/462* (2013.01); *H04N 21/44* (2013.01); *H04N 21/4516* (2013.01); *H04N 21/4532* (2013.01); *H04N 21/4858* (2013.01)

(58) Field of Classification Search
CPC .. H04N 21/462; H04N 21/44; H04N 21/4516; H04N 21/4532; H04N 21/4858
See application file for complete search history.

(56) References Cited

U.S. PATENT DOCUMENTS 8,792,138 B2 7/2014 Boggs et al.
9,370,299 B2 6/2016 Haine et al.
(Continued)

FOREIGN PATENT DOCUMENTS

CN 106796775 A 5/2017
JP 2003346137 A 12/2003
(Continued)

OTHER PUBLICATIONS

Asano Yuta, Individual Colorimetric Observers for Personalized Color Imaging, Thesis. Rochester Institute of Technology, Aug. 2, 2015, 167 pages.
(Continued)

*Primary Examiner* — Randy A Flynn
(74) *Attorney, Agent, or Firm* — Nixon & Vanderhye, P.C.

(57) ABSTRACT

An example electronic apparatus includes a processor configured to identify reference apparatus characteristics and reference cognitive characteristics defined for content to be displayed; identify apparatus characteristics of the electronic apparatus and user cognitive characteristics; and control a (Continued)

display to display an image of the content based on a calibration value of image characteristics based on at least one of a relationship between the reference apparatus characteristics and the apparatus characteristics of the electronic apparatus or a relationship between the reference cognitive characteristics and the user cognitive characteristics.

16 Claims, 16 Drawing Sheets

(51) Int. Cl.
H04N 21/45 (2011.01)
H04N 21/485 (2011.01)

(56) References Cited

U.S. PATENT DOCUMENTS

| | | | |
|---|---|---|---|
| 10,742,944 B1 * | 8/2020 | Abou Shousha | G06F 18/214 |
| 2004/0017379 A1 | 1/2004 | Ajito et al. | |
| 2007/0291179 A1 | 12/2007 | Sterling et al. | |
| 2009/0066720 A1 * | 3/2009 | Hong | H04N 9/64 |
| | | | 345/603 |
| 2010/0097407 A1 * | 4/2010 | Zulch | G09G 3/006 |
| | | | 345/690 |
| 2011/0243524 A1 | 10/2011 | Cho et al. | |
| 2012/0033937 A1 * | 2/2012 | Kim | H04N 21/235 |
| | | | 386/230 |
| 2012/0054664 A1 * | 3/2012 | Dougall | H04N 21/6582 |
| | | | 715/772 |
| 2013/0033528 A1 * | 2/2013 | Sarkar | G09G 5/02 |
| | | | 345/690 |
| 2013/0222412 A1 | 8/2013 | Pertierra | |
| 2014/0168250 A1 * | 6/2014 | Stauder | H04N 1/6027 |
| | | | 345/591 |
| 2016/0104438 A1 | 4/2016 | Han et al. | |
| 2018/0084305 A1 | 3/2018 | Sprenger et al. | |
| 2018/0108294 A1 | 4/2018 | Kwon et al. | |
| 2018/0139429 A1 | 5/2018 | Park et al. | |
| 2019/0166343 A1 * | 5/2019 | Anders | H04N 9/64 |

FOREIGN PATENT DOCUMENTS

| | | | |
|---|---|---|---|
| JP | 2004112169 A | 4/2004 | |
| JP | 2015233286 A | 12/2015 | |
| KR | 100664957 B1 | 1/2007 | |
| KR | 100712644 B1 | 5/2007 | |
| KR | 20070072887 A | 7/2007 | |
| KR | 20110111251 A | 10/2011 | |
| KR | 20120018145 A | 2/2012 | |
| KR | 20140035517 A | 3/2014 | |
| KR | 10-1803407 | 11/2017 | |
| KR | 20170134749 A | 12/2017 | |
| KR | 20220030615 A | 3/2022 | |
| WO | 2003091946 A1 | 11/2003 | |
| WO | 2012125802 A1 | 9/2012 | |
| WO | 2012166382 A2 | 12/2012 | |

OTHER PUBLICATIONS

International Search Report for PCT/KR2021/015002 mailed Feb. 23, 2022, 5 pages.
Written Opinion of the ISA for PCT/KR2021/015002 mailed Feb. 23, 2022, 4 pages.
Office Action dated Jul. 24, 2025 in Korean Patent Application No. 10-2020-0139962 and English-language translation.

\* cited by examiner

100

FIRST
ELECTRONIC
APPARATUS

200

SECOND
ELECTRONIC
APPARATUS

DIFFERENCE IN
APPARATUS CHARACTERISTICS

101

DIFFERENCE IN
COGNITIVE CHARACTERISTICS

201

CONTENT CREATOR

USER

FIG. 3

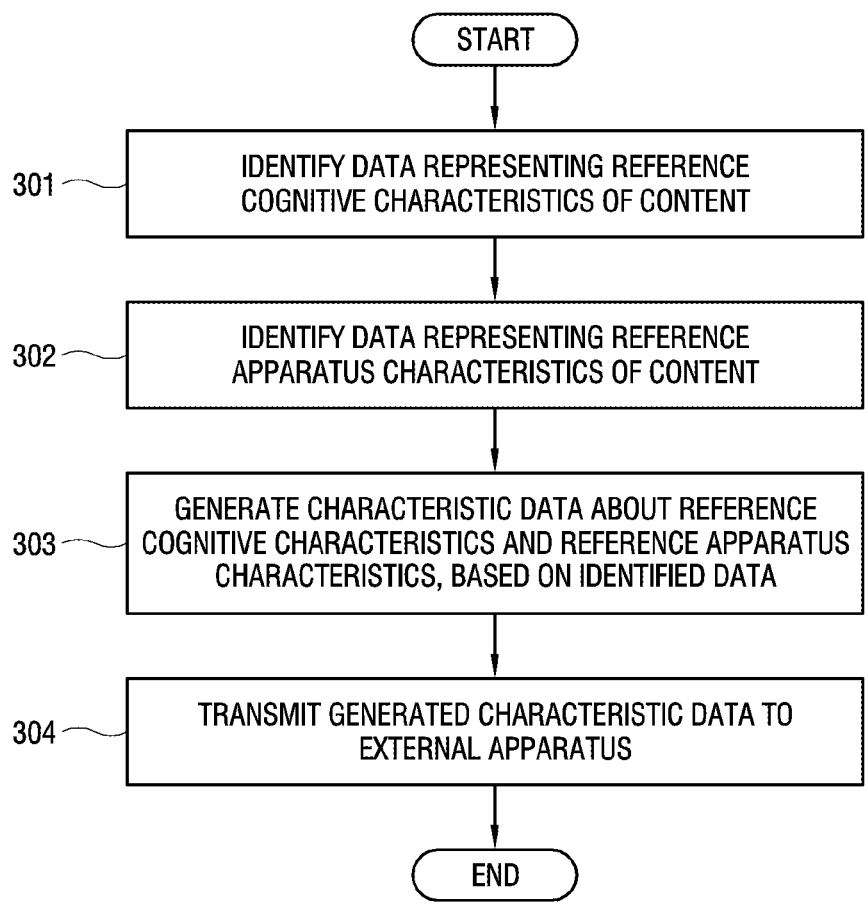

START

301 — IDENTIFY DATA REPRESENTING REFERENCE COGNITIVE CHARACTERISTICS OF CONTENT

302 — IDENTIFY DATA REPRESENTING REFERENCE APPARATUS CHARACTERISTICS OF CONTENT

303 — GENERATE CHARACTERISTIC DATA ABOUT REFERENCE COGNITIVE CHARACTERISTICS AND REFERENCE APPARATUS CHARACTERISTICS, BASED ON IDENTIFIED DATA

304 — TRANSMIT GENERATED CHARACTERISTIC DATA TO EXTERNAL APPARATUS

END

FIG. 12
1201              1202
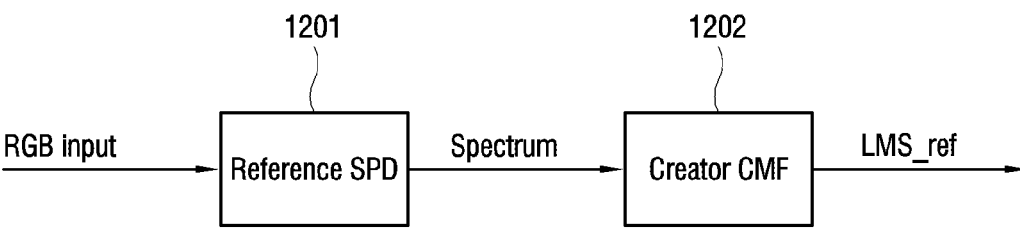
1203              1204
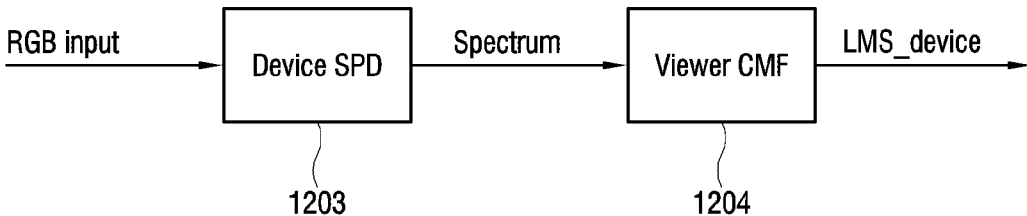

ELECTRONIC APPARATUS AND METHOD OF CONTROLLING THE SAME

CROSS-REFERENCE TO RELATED APPLICATIONS

This application is a continuation of PCT/KR2021/015002, designating the United States, filed Oct. 25, 2021, in the Korean Intellectual Property Receiving Office, which claims priority to Korean Patent Application No. 10-2020-0139962, filed Oct. 27, 2020, in the Korean Intellectual Property Office. The contents of each of these applications are incorporated by reference herein in their entireties.

BACKGROUND

Field

The disclosure relates to an electronic apparatus and a method of controlling the same, and, for example, to an electronic apparatus, which displays an image calibrated reflecting a user's characteristics, and a method of controlling the same.

Description of Related Art

A TV or similar electronic apparatus with a display receives various pieces of content from an external source and displays an image based on the received content.

The electronic apparatus may employ various types of displays, such as a liquid crystal display (LCD), an organic light emitting diode (OLED), and a micro-LED, and is varied in a reproduction range of colors depending on the types of displays.

Further, a user may have a unique sensitivity in perceiving colors, and therefore different user may perceive the same image to have different colors. In other words, a user may distort and perceive an image as having colors different from those intended by a creator.

Accordingly, there is a demand for an electronic apparatus that reduces distortion in image perception and provides the characteristics (e.g., colors) of an image to a user if possible as it is intended by a content provider.

Example embodiments of the disclosure can provide an electronic apparatus, and a method of controlling the same, in which an image is calibrated in consideration of apparatus characteristics and cognitive characteristics of a user who is viewing the image, so that an image having colors intended by a creator can be provided to a user.

SUMMARY

According to an example embodiment of the disclosure, an electronic apparatus may include a processor configured to identify reference apparatus characteristics and reference cognitive characteristics defined for content to be displayed; identify apparatus characteristics of the electronic apparatus and user cognitive characteristics; and control a display to display an image of the content based on a calibration value of image characteristics based on at least one of a relationship between the reference apparatus characteristics and the apparatus characteristics of the electronic apparatus or a relationship between the reference cognitive characteristics and the user cognitive characteristics.

In an example embodiment, the processor may be configured to identify the calibration value of the image characteristics based on a difference between the reference apparatus characteristics and the apparatus characteristics of the electronic apparatus.

In an example embodiment, the processor may be configured to identify the user cognitive characteristics as the same user cognitive characteristics as the reference cognitive characteristics.

In an example embodiment, the processor may be configured to identify the user cognitive characteristics different from the reference cognitive characteristics; and identify the calibration value of the image characteristics based on a difference between the reference cognitive characteristics and the user cognitive characteristics.

In an example embodiment, the processor may be configured to display a second image on each of a first display and a second display; and identify the user cognitive characteristics based on the apparatus characteristics of the first and second displays and user cognitive feedback information about the second image.

In an embodiment, the processor may be configured to identify user cognitive characteristics corresponding to a user who is using the electronic apparatus among a plurality of user cognitive characteristics grouped based on cognitive characteristics of a plurality of users.

In an example embodiment, the processor may be configured to obtain personal information of the user; and identify user cognitive characteristics corresponding to the user based on the obtained personal information.

In an example embodiment, the processor may be configured to derive a calibration value of image characteristics to transform unique data corresponding to the apparatus characteristics and the user cognitive characteristics of the electronic apparatus into reference data corresponding to the reference apparatus characteristics and the reference cognitive characteristics.

According to an example embodiment of the disclosure, a method of controlling an electronic apparatus may include identifying reference apparatus characteristics and reference cognitive characteristics defined for content to be displayed; identifying apparatus characteristics of the electronic apparatus and user cognitive characteristics; and controlling a display to display an image of the content based on a calibration value of image characteristics based on at least one of a relationship between the reference apparatus characteristics and the apparatus characteristics of the electronic apparatus or a relationship between the reference cognitive characteristics and the user cognitive characteristics.

In an example embodiment, the method may further include identifying the calibration value of the image characteristics based on a difference between the reference apparatus characteristics and the apparatus characteristics of the electronic apparatus.

In an example embodiment, the identifying of the user cognitive characteristics may include identifying the user cognitive characteristics as the same user cognitive characteristics as the reference cognitive characteristics.

In an example embodiment, the identifying of the user cognitive characteristics may include identifying the user cognitive characteristics different from the reference cognitive characteristics; and the method may further include identifying the calibration value of the image characteristics based on a difference between the reference cognitive characteristics and the user cognitive characteristics.

In an example embodiment, the identifying of the user cognitive characteristics may include displaying a second image on each of a first display and a second display; and identifying the user cognitive characteristics based on the apparatus characteristics of the first and second displays and user cognitive feedback information about the second image.

In an example embodiment, the identifying of the user cognitive characteristics may include identifying user cognitive characteristics corresponding to a user who is using the electronic apparatus among a plurality of user cognitive characteristics grouped based on cognitive characteristics of a plurality of users.

In an example embodiment, the identifying of the user cognitive characteristics may include obtaining personal information of the user; and identifying user cognitive characteristics corresponding to the user based on the obtained personal information.

In an embodiment, the method may further include deriving a calibration value of image characteristics to transform unique data corresponding to the apparatus characteristics of the electronic apparatus and the user cognitive characteristics into reference data corresponding to the reference apparatus characteristics and the reference cognitive characteristics.

According to an example embodiment, a non-transitory computer-readable nonvolatile recording medium may be recorded with a program which, when executed by a processor of an electronic apparatus, causes the electronic apparatus to identify reference apparatus characteristics and reference cognitive characteristics defined for content to be displayed; identify apparatus characteristics and user cognitive characteristics of the electronic apparatus; and control a display to display an image of the content based on a calibration value of image characteristics based on a calibration value of image characteristics based on at least one of a relationship between the reference apparatus characteristics and the apparatus characteristics of the electronic apparatus or a relationship between the reference cognitive characteristics and the user cognitive characteristics.

In an example embodiment, the identifying of the user cognitive characteristics may include identifying the user cognitive characteristics as the same user cognitive characteristics as the reference cognitive characteristics.

In an example embodiment, the identifying of the user cognitive characteristics may include identifying the user cognitive characteristics different from the reference cognitive characteristics, and the electronic apparatus may further be caused to identify the calibration value of the image characteristics based on a difference between the reference cognitive characteristics and the user cognitive characteristics.

According to the example embodiments, an electronic apparatus and a method of controlling the same can be provided in which an image is calibrated in consideration of apparatus characteristics and cognitive characteristics of a user who is viewing the image, so that the image having colors intended by a creator can be provided to a user.

BRIEF DESCRIPTION OF THE DRAWINGS

The above and/or other aspects of the disclosure will be more apparent by describing certain embodiments of the disclosure with reference to the accompanying drawings, in which:

FIG. 3 is a flowchart showing example operations of controlling a first electronic apparatus according to various embodiments;

FIGS. 12 and 13 are views for describing an example process for identifying the calibration value of image characteristics;

DETAILED DESCRIPTION

Figure 1:
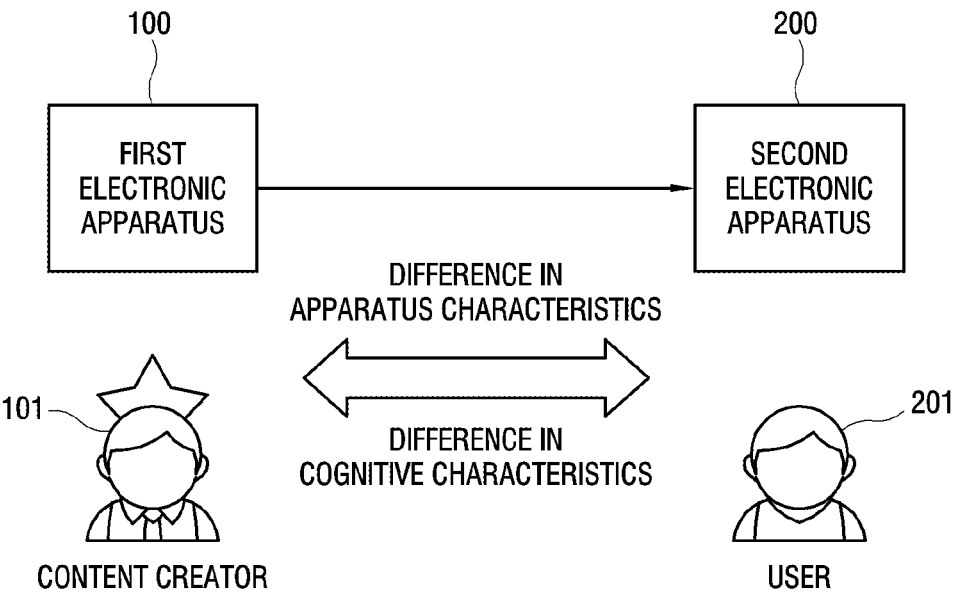
FIG. 1 illustrates an example of a system including a first electronic apparatus and a second electronic apparatus according to various embodiments.

Below, example embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following example embodiments should not be construed as limiting the disclosure and the configurations and functions thereof. In the following descriptions, details about generally known functions or features will be omitted if such details would obscure the disclosure.

In the following example embodiments, terms such as 'first', 'second', etc. are only used to distinguish one element from another, and singular forms are intended to include plural forms unless otherwise mentioned contextually. In the following example embodiments, it will be understood that terms 'comprise', 'include', 'have', etc. do not preclude the presence or addition of one or more other features, numbers, steps, operations, elements, components or combinations thereof. In addition, a 'module' or a 'portion' may perform at least one function or operation, be achieved by hardware, software, firmware, or combination of hardware, software, and/or firmware, and be integrated into at least one module. In the disclosure, at least one among a plurality of elements refers to not only all the plurality of elements, but also both to each one of the plurality of elements excluding the other elements and combinations thereof.

FIG. 1 illustrates an example of a system including a first electronic apparatus and a second electronic apparatus according to various embodiments.

According to an embodiment of the disclosure, a first electronic apparatus 100 may provide content to a second electronic apparatus 200.

The first electronic apparatus 100 may, for example, serve as a source, i.e., a signal source, such as a content provider or server, and may be, as shown in FIG. 1, provided to transmit content data to the second electronic apparatus 200.

The content provided by the first electronic apparatus 100, e.g., the content provider, may be generated based on predefined reference cognitive characteristics (or reference visibility characteristics).

The reference cognitive characteristics may, for example, refer to characteristic data that represents personal color perception characteristics of a content creator 101, e.g., an original author, and may be expressed by, for example, a color matching function (CMF). The content creator 101 may, for example, refer to an expert, in other words, a colorist or a professional creator, who is distinguished from general users.

Further, the content provided by the first electronic apparatus 100, e.g., content provider, may be generated based on predefined reference apparatus characteristics.

The reference apparatus characteristics may, for example, refer to characteristic data that represents the frequency, wavelength, and the like characteristics of a reference display involved or referenced in creating content, and may be expressed by, for example, spectral power distribution (SPD). The reference display may, for example, refer to a mastering apparatus used in creating content, and may be distinguished from a general home/commercial display.

The second electronic apparatus 200 may receive data of content provided by the first electronic apparatus 100, e.g., the content provider, and display an image based on the received content.

The image displayed on the second electronic apparatus 200 is recognized by a user 201. Here, the image recognized by a user 201 is affected by the cognitive characteristics of the user 201 who is viewing the image, the display environments of the image, etc.

The cognitive characteristics of a user 201 may, for example, refer to the characteristics (color, saturation, etc.) of an image which are perceived by a user 201 according to his/her own senses. The user cognitive characteristics may, for example, refer to characteristic data that represents the color cognitive characteristics of a user 201 who is viewing an image, and may be expressed by, for example, a CMF. The user cognitive characteristics are based on the personal subjective sense of a user 201, and therefore may be different from the foregoing reference cognitive characteristics of the content creator 101.

The display environments of the image include the apparatus characteristics of the second electronic apparatus 200, for example, the frequency, wavelength, etc. of the display on which an image is displayed. The apparatus characteristics may, for example, refer to characteristic data that represents the display characteristics of the second electronic apparatus 200 on which the image is displayed, and may be expressed by, for example, the SPD. According to an embodiment, the display of the second electronic apparatus 200 may refer to a home/commercial display, which is distinguished from the reference display involved or referenced in creating the content.

Therefore, when an image of content received from the first electronic apparatus 100 (hereinafter referred to as a first image) is displayed on the second electronic apparatus 200, a difference in cognitive characteristics or a difference in apparatus characteristics may cause the characteristics (color, etc.) of an image perceived by a user 201 to differ from those intended by a content creator 101.

According to an embodiment, the second electronic apparatus 200 may calibrate an image perceived by a user 201 based on the apparatus characteristics and the cognitive characteristics in consideration of the foregoing differences, thereby operating to reproduce content as intended by an original author. Specific operations of such image calibration will be described in detail through the following example embodiments.

Below, the configurations of the first and second electronic apparatuses according to an embodiment of the disclosure will be described with reference to the accompanying drawings.

Figure 2:
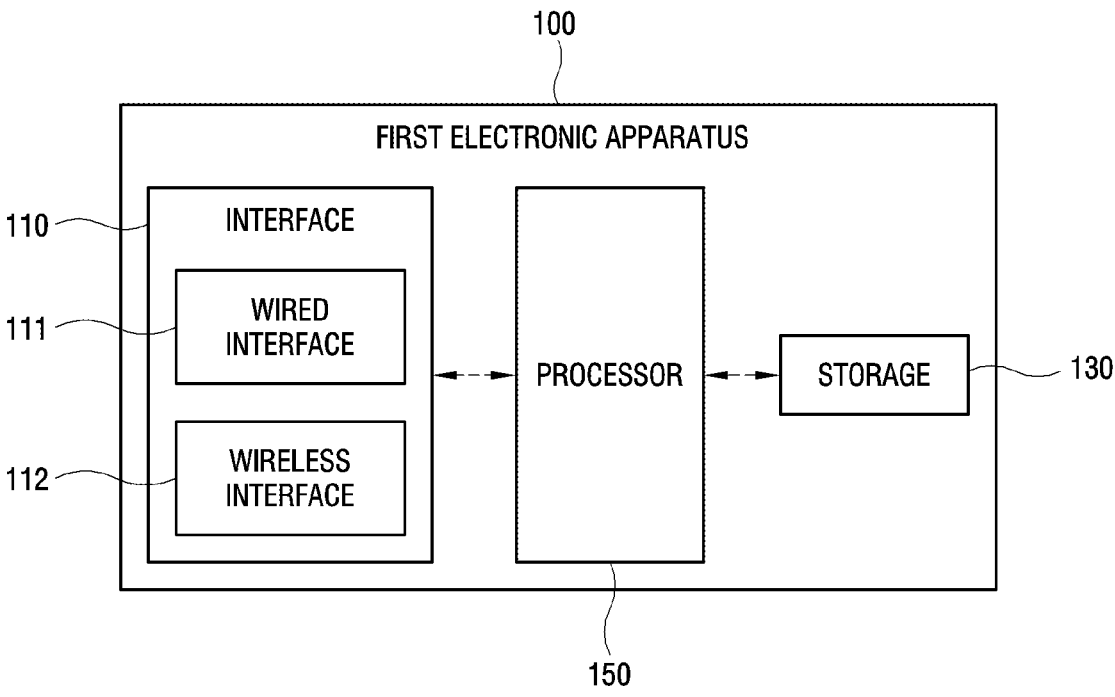
FIG. 2 is a block diagram showing a configuration of a first electronic apparatus according to various embodiments.

FIG. 2 is a block diagram of the first electronic apparatus according to various embodiments.

FIG. 2 shows example elements of the first electronic apparatus 100 according to an embodiment of the disclosure, and the first electronic apparatus may include elements different from those of FIG. 2. In other words, the first electronic apparatus 100 of the disclosure may include another element(s) in addition to the elements shown in FIG. 2, or may exclude at least one element from the elements shown in FIG. 2. Further, the first electronic apparatus 100 of the disclosure may be implemented by changing some elements of those shown in FIG. 2.

There are no limitations regarding the types of first electronic apparatuses 100, and the first electronic apparatuses 100 may include content providers or servers operated by various entities such as broadcasting stations, media business operators, service companies, system integrators (SI) companies, application markets, websites, etc.

The first electronic apparatus 100 may, as shown in FIG. 2, include an interface 110.

The interface 110 (including, e.g., interface circuitry) allows the first electronic apparatus 100 to communicate with various external apparatuses such as a second electronic apparatus 200.

The interface 110 may include a wired interface 111. The wired interface 111 may, for example, include a connector for transmitting/receiving a signal/data based on standards such as HDMI, HDMI-CEC, USB, Component, DP, DVI, Thunderbolt, RGB cables, etc. Here, the wired interface 111 may include at least one connector, terminal or port respectively corresponding to such standards.

The wired interface 111 is implemented to include an output port to output a signal, and to further include an input port to receive a signal as necessary, thereby interactively transmitting and receiving a signal.

The wired interface 111 may include a connector or port based on universal data transmission standards, such as a USB port. The wired interface 111 may include a connector or port to which an optical cable based on optical transmission standards is connectable. The wired interface 111 may include a connector or port based on network transmission standards such as Ethernet. For example, the wired interface 111 may be implemented as a local area network (LAN) connected to a router or a gateway by a wire.

The wired interface 111 may include connectors or ports for individually transmitting video/audio signals.

The wired interface 111 may be implemented by communication circuitry including wired communication modules (e.g., an S/W module, a chip, etc.) corresponding to various kinds of communication protocols.

According to an embodiment, the wired interface 111 may be built-in the first electronic apparatus 100 or implemented as a dongle or a module and detachably connected to the connector of the first electronic apparatus 100.

The interface 110 may include a wireless interface 112. The wireless interface 112 may be variously implemented corresponding to the implementation of the first electronic apparatus 100. For example, the wireless interface 112 may employ wireless communication methods such as radio frequency (RF), Zigbee, Bluetooth, Wi-Fi, ultrawideband (UWB), near field communication (NFC), etc.

The wireless interface 112 may, for example, be implemented by communication circuitry including wireless communication modules (e.g., an S/W module, a chip, etc.) corresponding to various kinds of communication protocols.

According to an embodiment, the wireless interface 112 may include a wireless local area network (WLAN) unit. The WLAN unit may be wirelessly connected to external apparatuses through an access point (AP) under control of a processor 150. The WLAN unit may include a Wi-Fi communication module.

According to an embodiment, the wireless interface 112 includes a wireless communication module supporting one-to-one direct communication between the first electronic apparatus 100 and the external apparatus wirelessly without the AP. The wireless communication module may be implemented to support Wi-Fi direct, Bluetooth (BT), Bluetooth low energy (BLE), or a similar communication method.

The first electronic apparatus 100 may provide content to at least one external apparatus, for example, the second electronic apparatus 200, through the interface 110.

There are no limitations regarding the types of content provided by the first electronic apparatus 100, and the content may, for example, include broadcast content, media content, applications, etc. The media content may, for example, be provided as a file-type video stream based on real-time streaming through a network, in the form of a video on demand (VOD) service.

According to an embodiment, the first electronic apparatus 100 may provide characteristic data (or a characteristic value), i.e., appended information including at least one of the reference cognitive characteristics or the reference apparatus characteristics, defined for content to be provided to the second electronic apparatus 200, to the second electronic apparatus 200 through the interface 110. Here, the appended information may be provided in the form of metadata along with the content, or may be provided as data separate from the content.

The first electronic apparatus 100 may include storage 130.

The storage 130 may be configured to store various data of the first electronic apparatus 100. The storage 130 may be implemented by a nonvolatile memory (or a writable memory) which can retain data even though the first electronic apparatus 100 is powered off, and mirror changes. The storage 130 may include at least one among a hard disk drive (HDD), a flash memory, an erasable programmable ROM (EPROM) or an electrically erasable programmable ROM (EEPROM).

Data stored in the storage 130 may, for example, include not only an operating system (OS) for operating the first electronic apparatus 100 but also various applications, image data, appended data, etc. executable on the OS.

According to an embodiment, the applications stored in the storage 130 may include a machine learning application or a deep learning application that operates based on previously performed learning. Further, the storage 130 may be configured to further store learning data so that the processor 150 can perform an operation based on a predetermined learning algorithm model.

According to an embodiment, the first electronic apparatus 100 may be implemented to perform an artificial intelligence (AI) operation in an on-device environment, e.g., perform operations by learning and algorithm models according to the learning based on the data of the storage 130 embedded therein. However, the first electronic apparatus 100 is not limited to an on-device AI apparatus. For example, the first electronic apparatus 100 may be implemented to perform operations by learning and algorithm models according to learning based on the data stored in a separate database accessible through the interface 110.

According to an embodiment, the storage 130 may be configured to store content and the characteristic data (or metadata), e.g., the appended information including content and at least one of the reference cognitive characteristics or the reference apparatus characteristics defined for the content. The characteristic data may be provided along with the content from a content creator to the first electronic apparatus 100, or may be generated in the first electronic apparatus 100 corresponding to the characteristics defined for the content, for example, at least one of the reference cognitive characteristics or the reference apparatus characteristics.

The first electronic apparatus 100 may include the processor 150.

The processor 150 (including, e.g., processing circuitry) may perform control to operate general elements of the first electronic apparatus 100. The processor 150 may include at least one general-purpose processor that loads at least a part of a control program from a nonvolatile memory, in which the control program is installed, into a volatile memory, and executes the loaded control program. For example, the processor 150 may include a central processing unit (CPU) or an application processor (AP).

The processor 150 may be implemented in the form of including a single core, dual cores, triple cores, quad cores, and similar multiple cores.

The processor 150 may include a plurality of processors, for example, a main processor, and a sub processor that operates in a sleep mode (e.g., during which only standby power is supplied without operation of the display apparatus). Further, the processor 150 may be connected to ROM and RAM through an internal bus, and the ROM and the RAM may be included in the storage 130.

As an example of the processor 150 according to an embodiment, a CPU or an application processor may be implemented as included in the main SoC mounted to the PCB internally provided in the first electronic apparatus 100.

The control program may include a program(s) achieved by at least one of a basic input/output system (BIOS), a device driver, an OS, firmware, a platform, or an application program (or application). According to an example embodiment, the application program may be previously installed or stored in the first electronic apparatus 100 when the first electronic apparatus 100 is manufactured, or may be installed in the first electronic apparatus 100 based on application program data received from the outside when it is required in the future. The application program data may, for example, be downloaded from an external server such as an application store to the first electronic apparatus 100. Such an application program, an external server, etc. are merely examples of a computer program product according to the disclosure, but the disclosure is not limited in this respect.

The control program may be recorded in a storage medium readable by a machine such as a computer. The machine-readable storage medium may be provided in the form of a non-transitory storage medium. Here, the term 'non-transitory storage medium' refers to a tangible device and does not include a signal (e.g., an electromagnetic wave), and this term does not distinguish between a case in which data is semi-permanently stored in the storage medium and a case in which data is temporarily stored. For example, a 'non-transitory storage medium' may include a buffer in which data is temporarily stored.

FIG. 3 is a flowchart showing example operations of controlling a first electronic apparatus according to various embodiments.

In the first electronic apparatus 100 according to an embodiment, the processor 150 may identify data that represents the reference cognitive characteristics of content (301).

The data representing the reference cognitive characteristics includes, for example, a CMF that represents the color cognitive characteristics of a content creator.

Figure 4:
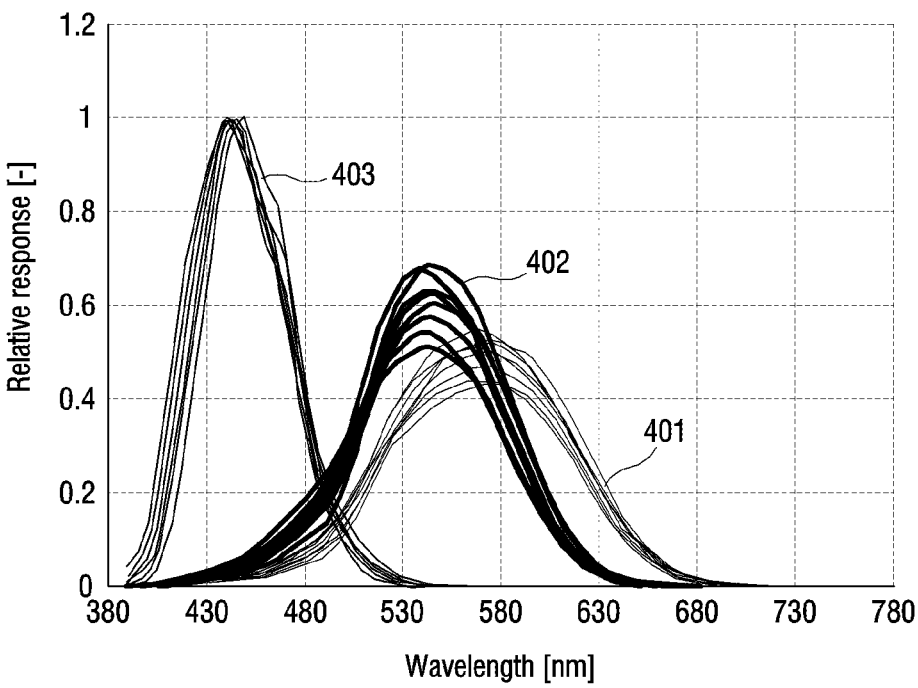
FIG. 4 illustrates an example of a color matching function (CMF) that represents reference cognitive characteristics according to various embodiments.

In connection with the CMF, FIG. 4 illustrates an example of a CMF that represents the reference cognitive characteristics according to various embodiments.

A human eye has cone cells that receive lights of three wavelengths, such as a long wavelength (L), a medium wavelength (M), and a short wavelength (S). Therefore, a human's color sense may be expressed with three variables.

The CMF may be modeled as a receptor that receives light of three wavelengths according to a human's perception, and defined to indicate the response, e.g., sensitivity of cone cells with respect to L, M, and S classified according to wavelengths.

Therefore, the CMF representing the reference cognitive characteristics may, as shown in FIG. 4, be expressed with three one-dimensional curves 401, 402 and 403 indicating the sensitivities respectively corresponding to L, M, and S in a wavelength domain.

According to an embodiment, the reference cognitive characteristics may be defined as the CMF expressed as above, i.e., a reference CMF or a creator CMF.

The CMF, e.g., the reference CMF may be previously defined as the reference cognitive characteristics as shown in FIG. 4, and stored in the storage 130. Here, the reference CMF may be provided by a content creator along with or separately from the content.

According to an embodiment, the reference cognitive characteristics may be previously defined by parameters based on a content creator's age, sex, viewing distances, etc.

Referring back to FIG. 3, the processor 150 may identify data that represents the reference apparatus characteristics of content (302). Here, the data representing the reference apparatus characteristics may include a spectral power distribution (SPD) that represents the characteristics (e.g., frequency characteristics) of the reference display involved or referenced in creating the content.

Figure 5:
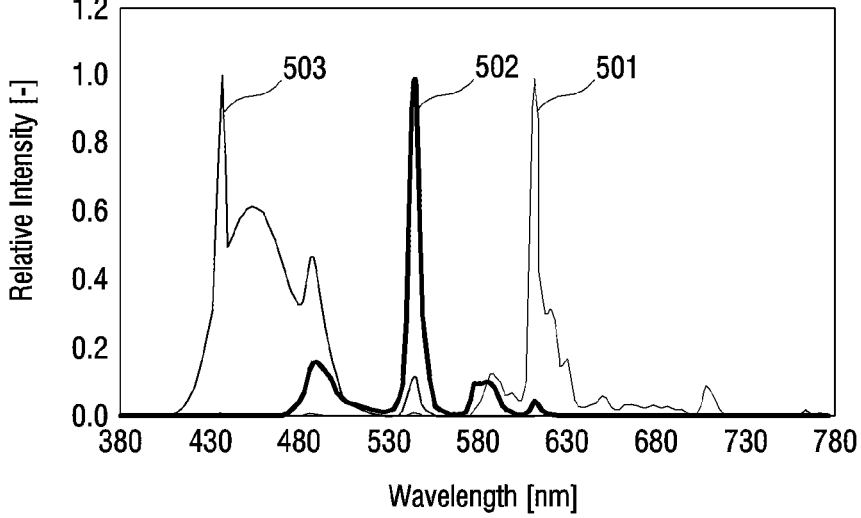
FIG. 5 illustrates an example of a spectral power distribution (SPD) that represents reference apparatus characteristics according to various embodiments.

FIG. 5 illustrates an example of an SPD that represents the reference apparatus characteristics according to various embodiments.

The display expresses various colors through a combination of three light sources corresponding to red (R), green (G), and blue (B).

According to an embodiment, the SPD representing the reference apparatus characteristics may, as shown in FIG. 5, be expressed with three one-dimensional curves 501, 502, and 503 indicating relative intensities respectively corresponding to R, G, and B in the wavelength domain, i.e., three spectral data of R, G, and B.

According to the types of display, the display may further include white (W) elements in addition to the R, G and B elements. In this case, according to an embodiment, the SPD representing the reference apparatus characteristics may be expressed with four spectral data respectively corresponding to R, G, B, and W.

According to an embodiment, the reference apparatus characteristics may be defined by the SPD expressed as above, e.g., the reference SPD.

The SPD, e.g., the reference SPD may, as shown in FIG. 5, be previously defined as the reference apparatus characteristics and stored in the storage 130. Here, the reference SPD may be provided by a content creator along with or separately from the content.

According to an embodiment, the reference apparatus characteristics may be defined by one of a plurality of SPDs corresponding to the types of display.

Figure 6:
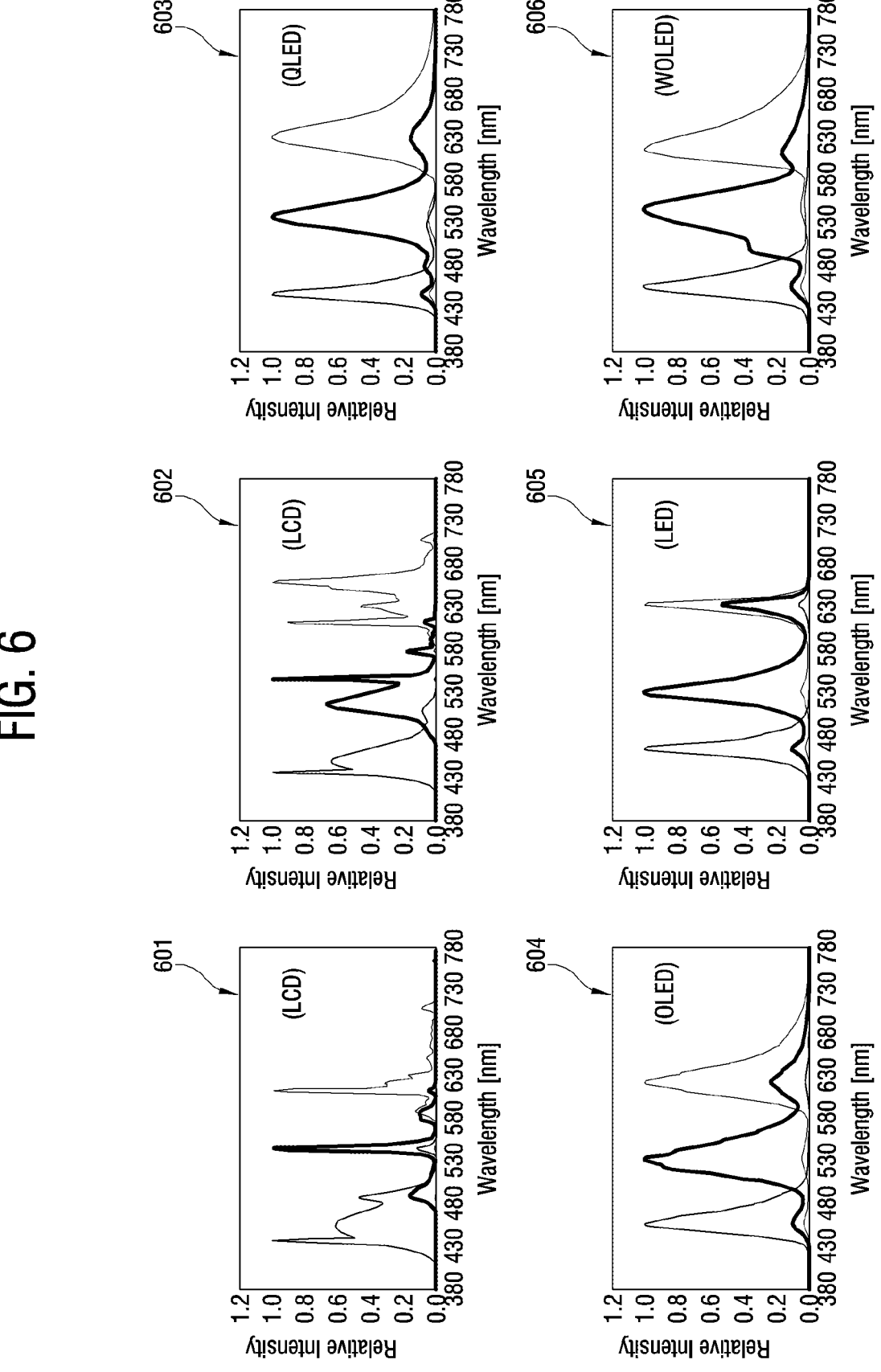
FIG. 6 illustrates various example SPDs corresponding to the types of display.

FIG. 6 illustrates various SPDs corresponding to the types of display.

As shown in FIG. 6, the display may have an SPD standardized according to the types of display.

The processor 150 may define the SPD corresponding to a reference display involved or referenced in creating content among the plurality of standardized SPDs as the reference apparatus characteristics for that content.

The processor 150 may generate the characteristic data about the reference cognitive characteristics (e.g., the reference CMF) and the reference apparatus characteristics (e.g., the reference SPD) based on the data identified in the operation 301 and 302 (303).

Figure 7:
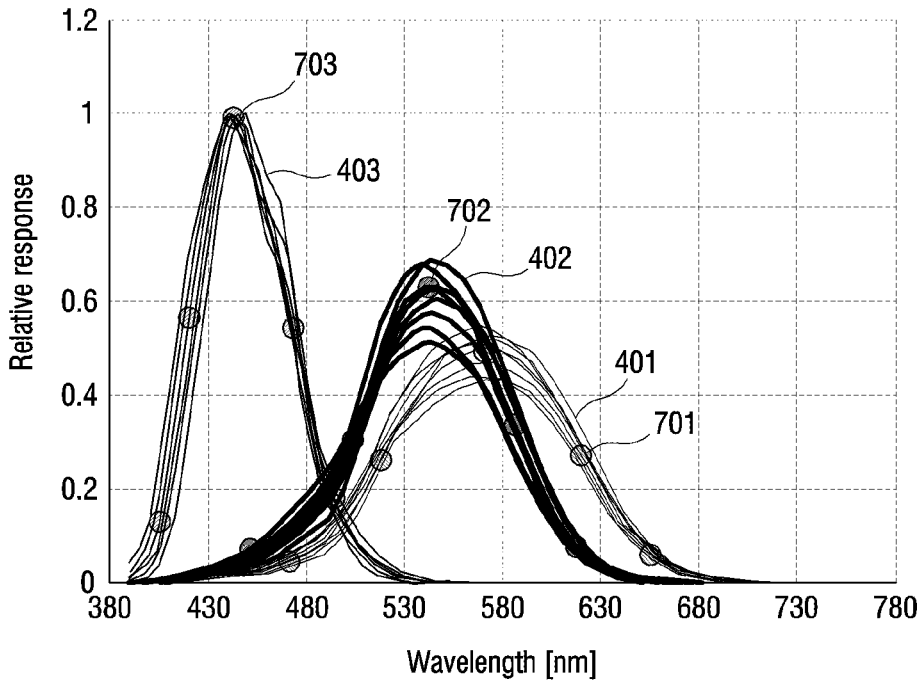
FIG. 7 illustrates an example of generating characteristic data according to various embodiments.

FIG. 7 illustrates an example of generating the characteristic data according to various embodiments.

In the case of the reference cognitive characteristics, the processor 150 may, as shown in FIG. 7, set a plurality of points 701, 702, and 703 for each data of the reference cognitive characteristics identified in the operation 301, e.g., for each curve 401, 402 or 403 of the reference CMF, and perform sampling for the values of the set points 701, 702, and 703.

In the same or similar manner, the processor 150 may set a plurality of points for each data of the reference apparatus characteristics identified in the operation 302, e.g., for each curve 501, 502 or 503 of the reference SPD, and perform sampling for the values of the set points.

FIG. 7 illustrates that five points are set for each curve 401, 402 or 403 by way of example, but the number of set points is not limited to those shown in FIG. 7.

For example, sampling data for each of six or seven curves may be generated as the characteristic data.

According to an embodiment, the characteristic data may be generated as a value (e.g., an integral value) obtained by multiplying the data of the reference cognitive characteristics, e.g., the values of the reference CMF and the data of the reference apparatus characteristics, e.g., the values of the reference SPD and adding all of the multiplied values.

For example, the processor 150 may generate the characteristic data based on values, e.g., (R, G, B) values obtained by multiplying the values sampled for each of L(R), M(G), and S(B) of the reference CMF and the values sampled for each of R, G, and B of the reference SPD, and adding all of the multiplied values.

Such a method of calculating the characteristic data is not limited to the example described above, and various mathematical operations or algorithms may be employed as long as the second electronic apparatus 200 (to be described later) can derive the reference cognitive characteristics and the reference apparatus characteristics from the characteristic data.

The characteristic data generated as above is provided to the second electronic apparatus 200, so that the characteristics of a displayed image can reflect both the apparatus characteristics and the cognitive characteristics referenced in creating the content.

Referring back to FIG. 3, the processor 150 may transmit the characteristic data of the content, generated in the operation 303, to an external apparatus, for example, the second electronic apparatus 200 through the interface 110 (304). Here, the second electronic apparatus 200 is a target to which the content will be transmitted, and the characteristic data may be transmitted to the second electronic apparatus 200 in the form of metadata along with the content or may be transmitted to the second electronic apparatus 20 as data separate from the content.

The embodiment of FIG. 3 shows an example in which the characteristic data is provided in the form of including both the reference cognitive characteristics and the reference apparatus characteristics. As necessary, the characteristic data may be generated and provided to represent one of the reference cognitive characteristics and the reference apparatus characteristics of the content.

According to an embodiment, the operations of the processor 150 may be implemented by a computer program stored in a computer program product provided separately from the first electronic apparatus 100. In this case, the computer program product may, for example, include a memory in which an instruction(s) corresponding to the computer program is stored, and a processor. When the instruction(s) is executed by the processor 150, the data representing the reference cognitive characteristics and the reference apparatus characteristics of content are identified, the characteristic data about the reference cognitive characteristics and the reference apparatus characteristics is generated based on the identified data, and the generated characteristic data is transmitted to an external apparatus.

Thus, the processor 150 of the first electronic apparatus 100 may download and execute the computer program stored in a separate computer program product, and perform the foregoing operations of the instruction(s).

Figure 8:
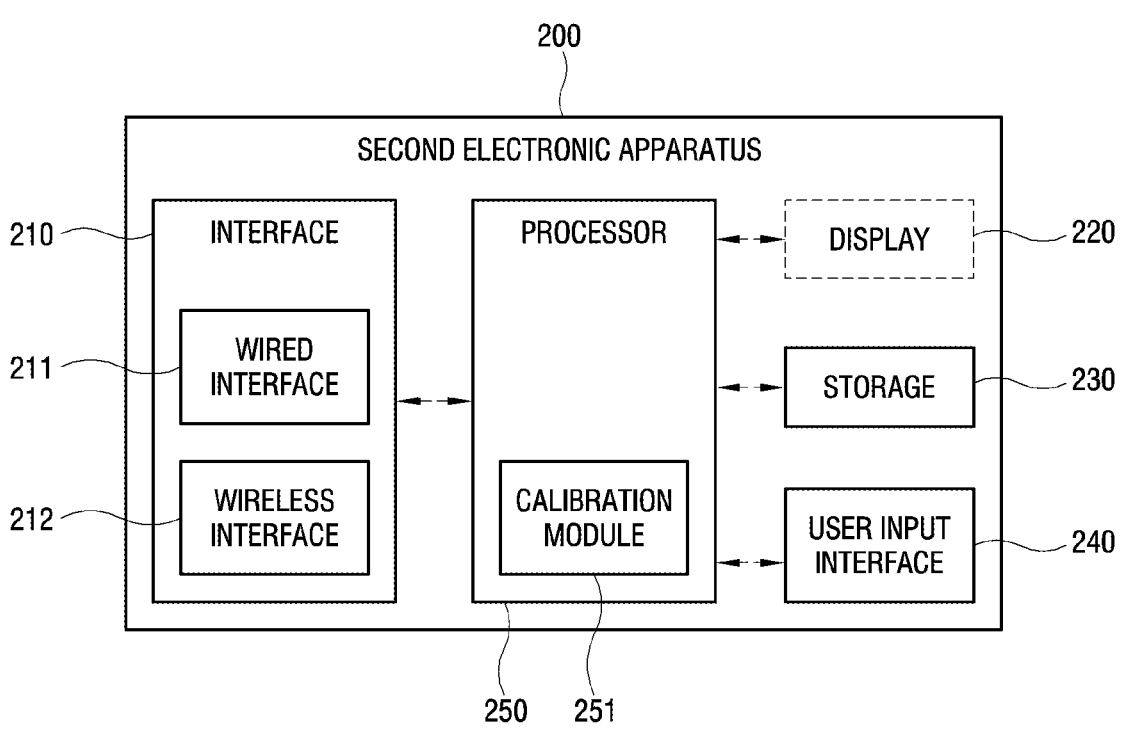
FIG. 8 is a block diagram showing the configuration of a second electronic apparatus according to various embodiments.

FIG. 8 is a block diagram of a second electronic apparatus according to various embodiments.

FIG. 8 shows example elements of the second electronic apparatus 200 according to an embodiment of the disclosure, and the second electronic apparatus may include elements different from those of FIG. 8. In other words, the second electronic apparatus 200 of the disclosure may include other element(s) in addition to the elements shown in FIG. 8, or may exclude at least one element from the elements shown in FIG. 8. Further, the second electronic apparatus 200 of the disclosure may be implemented by changing some elements of those shown in FIG. 8.

According to an embodiment, the second electronic apparatus 200 may be implemented as a display apparatus that includes a display 220.

The second electronic apparatus 200 according to an embodiment receives a signal from an external signal source, for example, the first electronic apparatus 100, such as data about content, and processes the received data of content according to preset processes so as to be displayed as an image on the display 220.

According to an embodiment, the second electronic apparatus 200 implemented as a display apparatus may, for example, be a TV that processes a broadcast image based on at least one among a broadcast signal, broadcast information, or broadcast data received from a transmitter of a broadcasting station. In this case, the second electronic apparatus 200 may include a tuner to be tuned to a channel corresponding to a broadcast signal.

However, the disclosure is not limited to the example of the second electronic apparatus 200 being a TV. For example, the second electronic apparatus 200 may be implemented as an image processing apparatus such as a set-top box that transmits a signal to an external display connected by a wire or wirelessly. For example, the second electronic apparatus 200 may be implemented as a terminal apparatus with a display, such as a smart phone, a tablet, and a smart pad (hereinafter referred to as a user terminal or a user device). For example, the second electronic apparatus 200 may be a monitor for a desktop or laptop computer (or a personal computer (PC)).

When the second electronic apparatus 200 is a TV, the second electronic apparatus 200 may receive broadcast content based on at least one among a broadcast signal, broadcast information, or broadcast data from a transmitter of a broadcasting station directly or through an additional apparatus connectable with the second electronic apparatus 200 by a cable, for example, through a set-top box (STB), a one-connect box (OC box), a media box, etc. Here, the connection between the second electronic apparatus 200 and the additional apparatus is not limited to a cable, but may employ various wired/wireless interfaces.

The second electronic apparatus 200 may, for example, wirelessly receive a radio frequency (RF) signal, e.g., broadcast content transmitted from a broadcasting station. To this end, the second electronic apparatus 200 may include an antenna for receiving a broadcast signal.

In the second electronic apparatus 200, the broadcast content may be received through a terrestrial wave, a cable, a satellite, etc., and a signal source is not limited to a broadcasting station. In other words, any apparatus or station capable of transmitting and receiving data may be included in the source according to the disclosure.

Standards of a signal received in the second electronic apparatus 200 may be varied depending on the types of the apparatus, and the second electronic apparatus 200 may receive a signal as image content based on high definition multimedia interface (HDMI), HDMI-consumer electronics control (CEC), display port (DP), digital visual interface (DVI), composite video, component video, super video, DVI, Thunderbolt, RGB cable, syndicat des constructeurs d'appareils radiorécepteurs et téléviseurs (SCART), universal serial bus (USB), or similar standards by a cable, according to an interface 210.

According to an embodiment, the second electronic apparatus 200 may be implemented as a smart TV or an Internet protocol (IP) TV. The smart TV refers, for example, to a TV that can receive and display a broadcast signal in real time, have a web browsing function to search and consume various pieces of content through the Internet while displaying the broadcast signal in real time, and provide a convenient user environment for this end. Further, the smart TV can provide an interactive service to a user because it includes an open software platform. Therefore, the smart TV can provide various pieces of content, for example, content of an application for a predetermined service to a user through the open software platform. Such an application refers to an application program for various kinds of services, for example, applications for social network service (SNS), finance, news, weather, map, music, movie, game, electronic book, and the like services.

The second electronic apparatus 200 may process a signal to display a moving image, a still image, an application, an on-screen display (OSD), a user interface (UI, hereinafter also referred to as graphic user interface (GUI)) for controlling various operations, etc. on a screen based on a signal/data stored in an internal/external storage medium.

The second electronic apparatus 200 may use wired or wireless network communication to receive content from various external apparatuses including the first electronic apparatus 100 as a source for providing content, but there are no limits to the kinds of communication.

Specifically, the second electronic apparatus 200 may use wireless network communication to receive a signal corresponding to standards of Wi-Fi, Wi-Fi Direct, Bluetooth, Bluetooth low energy, Zigbee, UWB, NFC, etc. as image content corresponding to the type of the interface 210 (to be described later). Further, the second electronic apparatus 200 may use Ethernet or similar wired network communication to receive a content signal.

The second electronic apparatus 200 may, as shown in FIG. 8, include an interface 210.

The interface 210 (including, e.g., interface circuitry) allows the second electronic apparatus 200 to communicate with various external apparatuses such as a first electronic apparatus 100.

The interface 210 may include a wired interface 211. The wired interface 211 may include a connector for transmitting/receiving a signal/data based on standards such as HDMI, HDMI-CEC, USB, Component, DP, DVI, Thunderbolt, RGB cables, etc. Here, the wired interface 211 may include at least one connector, terminal or port respectively corresponding to such standards.

The wired interface 211 is implemented to include an input port to receive a signal from an image source or the like, and may further include an output port as necessary, thereby interactively transmitting and receiving a signal.

The wired interface 211 may include a connector or port based on transmission standards for video and/or audio, such as an HDMI port, a DisplayPort, a DVI port, Thunderbolt, composite video, component video, super video, SCART, so as to connect with an antenna for receiving a broadcast signal based on terrestrial/satellite broadcasting or the like broadcasting standards or a cable for receiving a broadcast signal based on cable broadcasting standards. In an embodiment, the second electronic apparatus 200 may include a built-in antenna for receiving a broadcast signal.

The wired interface 211 may include a connector or port based on universal data transmission standards, such as a USB port. The wired interface 211 may include a connector or port to which an optical cable based on optical transmission standards is connectable. The wired interface 211 may include a connector or port to connect with an external microphone or an external audio device with a microphone, and receive an audio signal from the audio device. The wired interface 211 may include a connector or port to connect with the audio device such as a headset, an earphone, an external loudspeaker, etc., and transmit or output an audio signal to an audio device. The wired interface 211 may include a connector or port based on network transmission standards such as Ethernet. For example, the wired interface 211 may be implemented as a local area network (LAN) connected to a router or a gateway by a wire.

The wired interface 211 may connect with a set-top box, an optical media player or a similar external device, or connect with an external display apparatus, a loudspeaker, a server, etc. by 1:1 or 1:N (where, N is a natural number) wired connection through the connector or port, thereby receiving a video/audio signal from that external device or transmitting a video/audio signal to that external device. The wired interface 211 may include connectors or ports for individually transmitting video/audio signals.

The wired interface 211 may be implemented by communication circuitry including wired communication modules (e.g., an S/W module, a chip, etc.) corresponding to various kinds of communication protocols.

According to an embodiment, the wired interface 211 may be built-in the second electronic apparatus 200 or implemented as a dongle or a module and detachably connected to the connector of the second electronic apparatus 200.

The interface 210 may include a wireless interface 212. The wireless interface 212 may be variously implemented corresponding to the implementation of the second electronic apparatus 200. For example, the wireless interface 212 may employ wireless communication methods such as radio frequency (RF), Zigbee, Bluetooth, Wi-Fi, UWB, NFC, etc.

The wireless interface 212 may be implemented by communication circuitry including wireless communication modules (e.g., an S/W module, a chip, etc.) corresponding to various kinds of communication protocols.

According to an embodiment, the wireless interface 212 includes a wireless local area network (WLAN) unit. The WLAN unit may be wirelessly connected to external apparatuses through an access point (AP) under control of a processor 250. The WLAN unit includes a Wi-Fi communication module.

According to an embodiment, the wireless interface 212 includes a wireless communication module supporting one-to-one direct communication between the second electronic apparatus 200 and the external apparatus wirelessly without the AP. The wireless communication module may be implemented to support Wi-Fi direct, BT, BLE, or a similar communication method. When the second electronic apparatus 200 performs direct communication with an external apparatus, a storage 230 may be configured to store identification information (for example, a MAC address or an IP address) about an external apparatus, i.e., a communication target device.

In the second electronic apparatus 200 according to an embodiment, the wireless interface 212 is provided to perform wireless communication with an external apparatus through at least one of a WLAN unit and a wireless communication module according to performance.

According to an embodiment, the wireless interface 212 may further include communication modules using various communication methods such as mobile communication including long-term evolution (LTE), EM communication including a magnetic field, and visible light communication.

The wireless interface 212 may wirelessly communicate with a server on a network, thereby transmitting and receiving a data packet to and from the server.

The wireless interface 212 may further include an infrared (IR) transmitter and/or an IR receiver to transmit and/or receive an IR signal according to IR communication standards. The wireless interface 212 may receive or input a remote control signal from a remote controller or other external devices through the IR transmitter and/or IR receiver, or may transmit or output a remote control signal to other external devices. In an embodiment, the second electronic apparatus 200 may transmit and receive a remote control signal to and from a remote controller or other external devices through the wireless interface 212 based on other standards such as Wi-Fi and Bluetooth.

When a video/audio signal received through the interface 210 is a broadcast signal, the second electronic apparatus 200 may further include a tuner to be tuned to channels for the received broadcast signal.

According to an embodiment, the wireless interface 212 may transmit predetermined data, such as information of a user voice received through the microphone or a similar sound receiver, to the server and/or a similar external apparatus. Here, there are no limitations regarding the types/kinds of data to be transmitted, and the data may, for example, include an audio signal corresponding to voice uttered by a user, or voice features extracted from the audio signal.

Further, the wireless interface 212 may receive data of a result from processing that user voice from the server and/or similar external apparatus. The second electronic apparatus 200 may output a sound corresponding to the result from processing the voice through an internal or external loudspeaker, based on the received data.

However, the foregoing embodiment is merely an example, and the second electronic apparatus 200 may process a user voice by itself without transmitting the user voice to the server. In other words, according to an embodiment, the second electronic apparatus 200 may be implemented to serve as a speech-to-text (STT) server.

The second electronic apparatus 200 may perform communication with the remote controller or the like input device through the wireless interface 212, and receive a sound signal corresponding to a user voice from the input device.

In the second electronic apparatus 200 according to an embodiment, the communication module for communication with the first electronic apparatus 100 or the external server may be different from the communication module for communication with the remote controller. For example, the second electronic apparatus 200 may perform communication with the server through an Ethernet modem or a Wi-Fi module, and perform communication with the remote controller through a Bluetooth module.

In the second electronic apparatus 200 according to an embodiment, the communication module for communication with the first electronic apparatus 100 or the external server may be the same as the communication module for communication with the remote controller. For example, the second electronic apparatus 200 may use a Bluetooth module to perform communication with the server and the remote controller.

The second electronic apparatus 200 may receive content from at least one external apparatus, for example, the first electronic apparatus 100 through the interface 210.

According to an embodiment, the second electronic apparatus 200 may obtain characteristic data (or a characteristic value), e.g., appended information including at least one of reference cognitive characteristics or reference apparatus characteristics, defined for content to be provided from the first electronic apparatus 100, from the first electronic apparatus 100 through the interface 210. Here, the appended information may be received in the form of metadata along with the content, or may be received as data separate from the content.

The second electronic apparatus 200 may include the display 220.

The display 220 displays an image, i.e., a first image based on content received from the first electronic apparatus 100.

The display 220 may be implemented by various display types such as liquid crystal, plasma, light-emitting diode, organic light-emitting diode, surface-conduction electron-emitter, carbon nano-tube, nano-crystal, etc., but is not limited in this respect. According to an embodiment, the display 220 may include a display panel for displaying an image thereon, and further include additional elements, for example, a driver according to the type of display.

According to an embodiment, the display 220 may further display an image for measuring the user cognitive characteristics, i.e., a second image. The measurement of the user cognitive characteristics based on a second image will be described in detail below with reference to FIG. 16.

The second electronic apparatus 200 may include the storage 230.

The storage 230 may be configured to store various data of the second electronic apparatus 200. The storage 230 may, for example, be implemented by a nonvolatile memory (or a writable memory) which can retain data even though the second electronic apparatus 200 is powered off, and mirror changes. The storage 230 may include at least one among an HDD, a flash memory, an EPROM or an EEPROM.

The storage 230 may further include a volatile memory such as a RAM, and the volatile memory may be provided as a dynamic random-access memory (DRAM) or a static random-access memory (SRAM), of which reading or writing speed for the second electronic apparatus 200 is faster than that of the nonvolatile memory. In other words, the term 'storage' in the disclosure may, for example, encompass a volatile memory, a cache memory provided inside the processor 250, etc. as well as a nonvolatile memory.

Data stored in the storage 230 may, for example, include not only an OS for operating the second electronic apparatus 200 but also various applications, image data, appended data, etc. executable on the OS.

Specifically, the storage 230 may store a signal or data input/output corresponding to the operations of the elements under control of the processor 250. The storage 230 may be configured to store a program for controlling the second electronic apparatus 200, a UI related to an application provided by a manufacturer or downloaded from the outside, images for providing the UI, user information, documents, database, or related data.

According to an embodiment, the applications stored in the storage 230 may include a machine learning application or a deep learning application that operates based on previously performed learning. Further, the storage 230 may be configured to further store learning data so that the processor 250 can perform an operation based on a predetermined learning algorithm model.

According to an embodiment, the second electronic apparatus 200 may be implemented to perform an AI operation in an on-device environment, i.e., perform operations by learning and algorithm models according to the learning based on the data of the storage 230 embedded therein. However, the second electronic apparatus 200 according to the disclosure is not limited to an on-device AI apparatus. For example, in an embodiment, the second electronic apparatus 200 may be implemented to perform operations by learning and algorithm models according to learning based on data stored in a separate database accessible through the interface 210.

According to an embodiment, the storage 230 may be configured to store the user cognitive characteristics set for a user who actually uses the second electronic apparatus 200.

The user cognitive characteristics refer, for example, to characteristic data that represents the color cognitive characteristics of a user who is viewing an image through the second electronic apparatus 200, and may, for example, be expressed by the CMF as described above with reference to FIG. 4.

According to an embodiment, the user cognitive characteristics may be derived by a perception previously performed using two or more displays.

According to an embodiment, user cognitive characteristics may be identified as one among a plurality of user cognitive characteristics grouped based on the cognitive characteristics of a plurality of users. Here, the user cognitive characteristics may, for example, be identified based on a user's personal information or a user's input.

The storage 230 may be configured to store apparatus characteristics of the second electronic apparatus 200.

The apparatus characteristics refers, for example, to characteristic data that represents the characteristics of the display 220, and may, for example, be expressed by the SPD as described above with reference to FIGS. 5 and 6.

According to an embodiment, the apparatus characteristics of the second electronic apparatus 200 may be identified as corresponding to the display 220 among a plurality of SPDs standardized as shown in FIG. 6. The apparatus characteristics may be previously stored in a stage of manufacturing the second electronic apparatus 200.

The second electronic apparatus 200 may include a user input interface 240.

The user input interface 240 (including, e.g., interface circuitry) may be implemented as a keypad (or an input panel) including a power key, a menu key, and similar buttons provided in a front or lateral area, and receive a user's input.

According to an embodiment, the user input interface 240 may further include an input device (for example, a remote controller, a mouse, a keyboard, a smartphone with an application capable of remotely controlling the second electronic apparatus 200, etc.) that generates a command/data/ information/signal preset for remotely controlling the second electronic apparatus 200 and transmits the preset signal to the second electronic apparatus 200, or a voice input unit that receives a voice/sound uttered by a user like a microphone. The second electronic apparatus 200 may receive a signal corresponding to a user's input from a remote input device through the wireless interface 212.

The second electronic apparatus 200 may include the processor 250.

The processor 250 performs control to operate the elements of the second electronic apparatus 200. The processor 250 may, for example, include at least one general-purpose processor that loads at least a part of a control program from a nonvolatile memory, in which the control program is installed, into a volatile memory, and executes the loaded control program. For example, the processor 250 may include a CPU or an application processor (AP).

The processor 250 may be implemented to include a single core, dual cores, triple cores, quad cores, and similar multiple cores.

The processor 250 may include a plurality of processors, for example, a main processor, and a sub processor that operates in a sleep mode (during which only standby power is supplied without operation of the electronic apparatus). Further, the processor 250 may be connected to a ROM and a RAM through an internal bus, and the ROM and the RAM may be included in the storage 230.

As an example of the processor 250 according to an embodiment, a CPU or an application processor may be implemented as being included in a main SoC mounted to a PCB internally provided in the second electronic apparatus 200.

The control program may include a program(s) achieved by at least one of a BIOS, a device driver, an OS, firmware, a platform, or an application program (or application). According to an example embodiment, the application program may be previously installed or stored in the second electronic apparatus 200 when the second electronic apparatus 200 is manufactured, or may be installed in the second electronic apparatus 200 based on application program data received from the outside when it is required in the future. The application program data may, for example, be downloaded from an external server such as an application store to the second electronic apparatus 200. Such an application program, an external server, etc. are merely examples of a computer program product according to the disclosure, but the disclosure is not limited in this respect.

The control program may be recorded in a storage medium readable by a machine such as a computer. The machine-readable storage medium may be provided in the form of a non-transitory storage medium. Here, the term 'non-transitory storage medium' may refer to a tangible device and does not include a signal (e.g., an electromagnetic wave), and this term does not distinguish between a case in which data is semi-permanently stored in the storage medium and a case in which data is temporarily stored. For example, a 'non-transitory storage medium' may include a buffer in which data is temporarily stored.

According to an embodiment, the processor 250 may include a calibration module 251 to calibrate an image of content to be displayed (hereinafter referred to as a color calibration module). The second electronic apparatus 200 according to an embodiment of the disclosure may implement metamerism for color by image calibration through the calibration module 251.

The calibration module 251 may be implemented as a software block of the processor 250, implemented as a separate hardware component, for example, a microprocessor or an integrated circuit (IC) divided from a main processor such as a CPU or an application processor, or implemented by a combination of hardware and software.

According to an embodiment, the calibration module 251 identifies a calibration value of image characteristics based on a relationship between reference data defined for content to be displayed and unique data of the second electronic apparatus 200, and calibrates an image of content based on the identified calibration value of the image characteristics.

Here, the reference data may include at least one of the reference cognitive characteristics or the reference apparatus characteristics obtained from the first electronic apparatus 100, e.g., the content provider. Further, the unique data may include at least one of the apparatus characteristics of the second electronic apparatus 200 or the user cognitive characteristics of a user who is using the second electronic apparatus 200.

The calibration module 251 may identify the calibration value of the image characteristics based on a difference between the reference apparatus characteristics and the apparatus characteristics of the second electronic apparatus 200. Here, in some cases, the apparatus characteristics of the second electronic apparatus 200 may be the same as the reference apparatus characteristics.

Further, the calibration module 251 may identify the calibration value of the image characteristics based on a difference between the reference cognitive characteristics and the user cognitive characteristics of a user who is using the second electronic apparatus 200. Here, in some cases, the user cognitive characteristics may be the same as the reference cognitive characteristics.

As described above, the difference in the apparatus characteristics and the difference in the cognitive characteristics are taken into account, so that the image characteristics displayed on the second electronic apparatus 200 can reflect image characteristics intended when the content is created.

According to various embodiments, the operations performed by the second electronic apparatus 200 to display a calibrated image of content may, for example, be performed by the calibration module 251, i.e., the processor 250.

Figure 9:
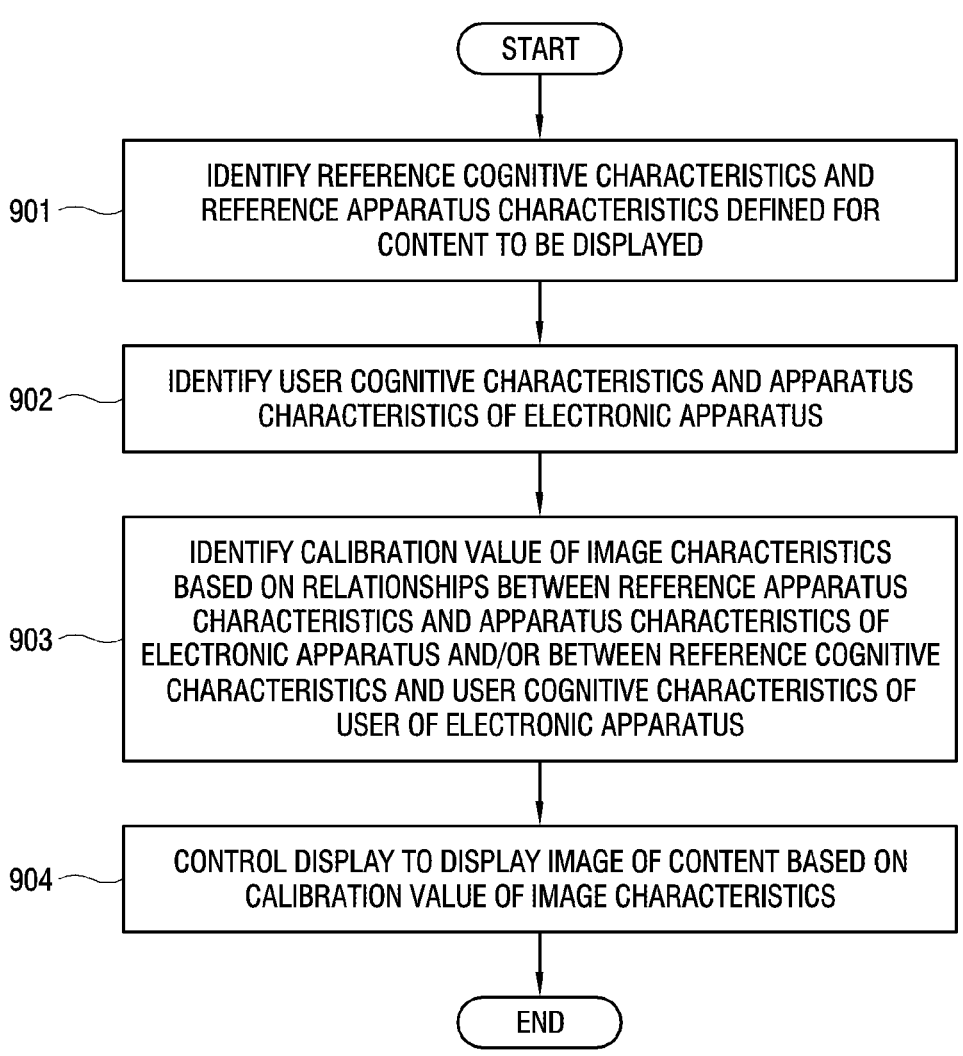
FIG. 9 is a flowchart showing example operations of controlling a second electronic apparatus according to various embodiments.

FIG. 9 is a flowchart showing example operations of controlling a second electronic apparatus according to various embodiments.

In the second electronic apparatus 200 according to an embodiment of the disclosure, the processor 250 may identify the reference apparatus characteristics and the reference cognitive characteristics defined for content to be displayed on the display 220 (901).

The reference apparatus characteristics and the reference cognitive characteristics, in other words, the reference data, may be included in the characteristic data received from the first electronic apparatus 100 in the operation 304 of FIG. 3.

Figure 10:
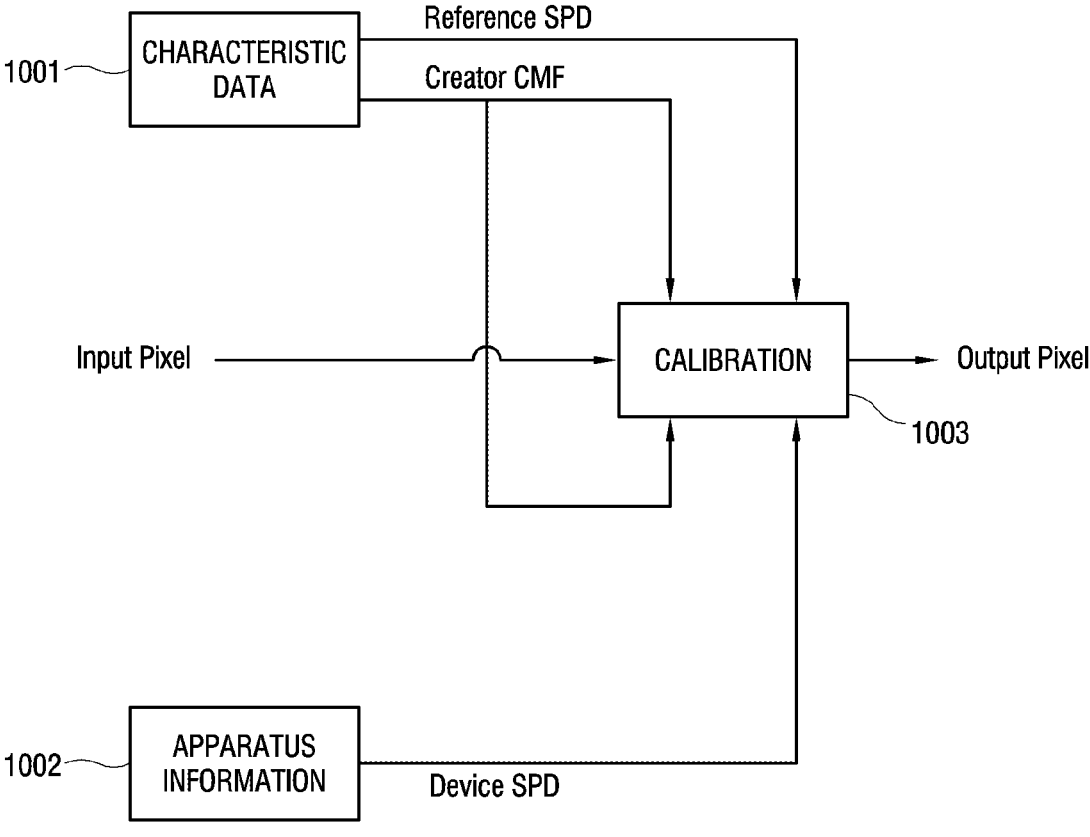
FIG. 10 illustrates an example of a control block diagram of a second electronic apparatus according to various embodiments.

The operation 901 of FIG. 9 will be described in detail with reference to FIG. 10. FIG. 10 illustrates an example of a control block diagram of a second electronic apparatus according to various embodiments.

Referring to FIG. 10, the processor 250 may receive the characteristic data (metadata) 1001 from the first electronic apparatus 100 through the interface 210.

The processor 250 may identify the reference apparatus characteristics and the reference cognitive characteristics by parsing the received characteristic data 1001.

For example, as shown in FIG. 10, the processor 250 may derive the reference SPD and the creator CMF, e.g., the reference CMF, from the characteristic data 1001 by performing an inverse transformation to the calculations performed to generate the characteristic data of the operation 304 of FIG. 3.

The processor 250 may identify the foregoing derived reference SPD as the reference apparatus characteristics, and identify the foregoing derived creator CMF (e.g., the reference CMF) as the reference cognitive characteristics.

Referring back to FIG. 9, the processor 250 may identify the user cognitive characteristics and the apparatus characteristics of the second electronic apparatus 200 (902).

The apparatus characteristics refer, for example, to data that represents the characteristics of the display 220, and may for example be expressed by the SPD as shown in FIGS. 5 and 6. For example, the apparatus characteristics may be previously stored in the storage 230.

The processor 250 may, as shown in FIG. 10, identify the device SPD of the second electronic apparatus 200, which is read from apparatus information 1002 previously stored in the storage 230, as the apparatus characteristics.

The user cognitive characteristics refer, for example, to data that represents the color cognitive characteristics of a user who is viewing an image, and may for example be expressed by the CMF as described with reference to FIG. 4.

According to an embodiment, the processor 250 may identify that the user cognitive characteristics are the same as the reference cognitive characteristics.

In other words, referring to FIG. 10, the creator CMF corresponding to the reference cognitive characteristics defined for content to be displayed may be identified as the user cognitive characteristics.

In this case, the second electronic apparatus 200 may use the user cognitive characteristics for image calibration (to be described later), without carrying out a perception experiment for deriving a user's own cognitive characteristics, or receiving personal information or a user's input.

According to an embodiment, the processor 250 may identify user cognitive characteristics different from the reference cognitive characteristics. In this case, the unique cognitive characteristics of a user who is actually using the second electronic apparatus 200 may be identified as the user cognitive characteristics. A specific embodiment of deriving a user's unique cognitive characteristics will be described below in more detail with reference to FIGS. 14 and 15.

Referring back to FIG. 9, the processor 250 may identify the calibration value of the image characteristics, based on the reference apparatus characteristics and the reference cognitive characteristics identified in the operation 901 and the apparatus characteristics and the user cognitive characteristics of the electronic apparatus identified in the operation 902 (903).

Figure 11:
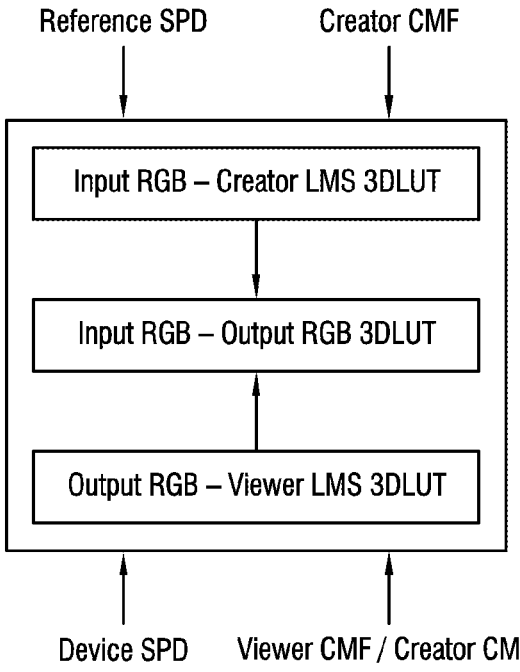
FIG. 11 is a block diagram schematically showing example operations for identifying the calibration value of the image characteristics in FIG. 9.
Figure 13:
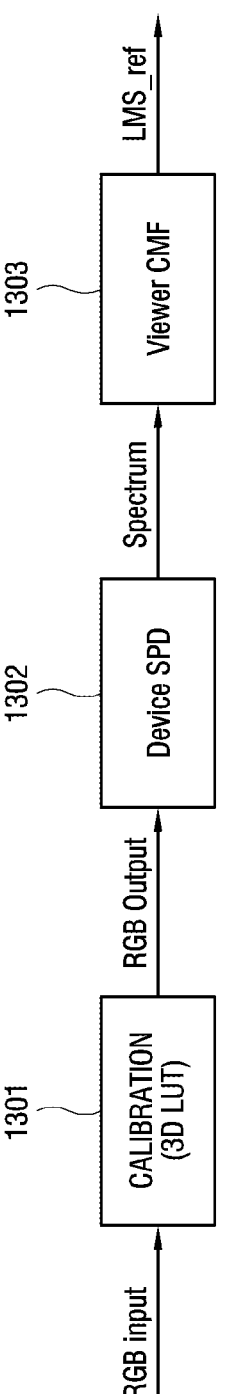

FIG. 11 is a block diagram schematically showing example operations for identifying the calibration value of the image characteristics in the embodiment shown in FIG. 9, and FIGS. 12 and 13 are views for describing an example process for identifying the calibration value of the image characteristics.

The calibration module 251 of the processor 250 may use the information identified in the operations 901 and 902 of FIG. 9 as an input value to derive the calibration value of the image characteristics. Here, the calibration value of the image characteristics may, for example, be derived as an RGB value applied to an image of content to be displayed.

An RGB input may be transformed into a spectrum through the SPD of FIG. 5, and the spectrum may be derived as the sensitivities, e.g., stimulus values for the cone cells respectively corresponding to L, M, and S through the CMF of FIG. 4.

Referring to FIG. 12, the reference apparatus characteristics, e.g., the reference SPD 1201 and the reference cognitive characteristics, e.g., the creator CMF 1202, which are identified in the operation 901 of FIG. 9, may be used to derive reference data LMS_ref for content from the RGB input.

Further, the apparatus characteristics, e.g., the unique SPD 1203 of the second electronic apparatus 200 and the user cognitive characteristics, e.g., a user's color cognitive characteristics (i.e., viewer CMF) 1204, which are identified in the operation 902 of FIG. 9, may be used to derive a user's unique data LMS_device from the RGB input. Here, the user cognitive characteristics (e.g., viewer CMF) may be the same as the creator CMF. In other words, as shown in FIG. 10, the creator CMF may be used as it is without deriving the viewer CMF.

The calibration module 251 may identify the calibration value of the image characteristics based on a relationship, e.g., a difference between the reference data LMS_ref and the unique data LMS_device derived as above.

Specifically, the calibration module 251 may identify the calibration value of the image characteristics to convert the unique data LMS_device into the reference data LMS_ref for content.

Referring to FIG. 13, the RGB input may be transformed into an RGB out through a 3D lookup table (LUT) 1301.

According to an embodiment, the calibration module 251 may identify the calibration value of the image characteristics by deriving the 3D LUT 1301.

For example, in a case of a sampled RGB input, the calibration module 251 may be implemented by a method of deriving the 3D LUT 1301 in which a corresponding RGB output is mapped for each color. As another example, in a case of an unsampled RGB input, the calibration module 251 may be implemented by a method of extracting the 3D LUT 1301 in which an RGB input is transformed into an RGB output based on interpolation or the like.

Based on the principle described with reference to FIG. 12, the RGB output transformed through the 3D LUT 1301 may be transformed into a spectrum through the unique SPD 1302 of the second electronic apparatus 200, and transformed into the reference data LMS_ref corresponding to the content creation environment through a user's color cognitive characteristics (e.g., the viewer CMF) 1303.

Therefore, in the foregoing example embodiment, the calibration value of the image characteristics may be expressed in the form of the 3D LUT (or a transform 3D LUT) 1301 in which an RGB input is transformed into an RGB output according to colors so that the reference data LMS_ref can be derived from the RGB output through the device SPD 1302 of the second electronic apparatus 200 and a user's color cognitive characteristics (or a viewer CMF) 1303.

According to an embodiment, the calibration module 251 may use mathematical operations based on matrices as follows.

$$S(\lambda) = r \cdot R_{max}(\lambda) + g \cdot G_{max}(\lambda) + b \cdot B_{max}(\lambda) \qquad \text{[Equation 1]}$$

$$L = K \int S(\lambda) \cdot \bar{l}(\lambda)d\lambda = K \int (r \cdot R_{max}(\lambda) + g \cdot G_{max}(\lambda) + b \cdot B_{max}(\lambda)) \cdot \bar{l}(\lambda)d\lambda =$$

$$r \cdot L_{r,max} + g \cdot L_{g,max} + b \cdot L_{b,max}$$

where r, g, and b are RGB inputs (linear RGB without gamma correction); $R_{max}(\lambda)$, $G_{max}(\lambda)$, and $B_{max}(\lambda)$ are the spectra of RGB channel maximum values as the unique data (e.g., the device SPD) of the second electronic apparatus; and $S(\lambda)$ is each display output spectrum for the input r, g and b. Further, $\bar{l}(\lambda)$, $\bar{m}(\lambda)$, $\bar{s}(\lambda)$ are the LMS function or CMF of a creator/user; $L_{i,max}$, $M_{i,max}$, and $S_{i,max}$ are LMS values of a creator/user's i channel (R, G, or B) maximum values; and L, M, S are LMS values of a creator/viewer for the input r, g, and b.

A 3×3 matrix for transforming the RGB input into the LMS by the foregoing equation may be derived as the following equation 2.

$$\begin{bmatrix} L \\ M \\ S \end{bmatrix} = \begin{bmatrix} L_{r,max} & L_{g,max} & L_{b,max} \\ M_{r,max} & M_{g,max} & M_{b,max} \\ S_{r,max} & S_{g,max} & S_{b,max} \end{bmatrix} \cdot \begin{bmatrix} r \\ g \\ b \end{bmatrix} \qquad \text{[Equation 2]}$$

Therefore, as shown in equation 3, the 3×3 matrix ($RGB2LMS_{ref}$) derived from the Equation 2 may be used to derive the reference data (LMS_ref) for the content from the RGB input.

Further, in the same manner, as shown in the following equation 3, a 3×3 matrix ($RGB2LMS_{device}$) derived from the equation 2 may be used to derive a user's unique data (LMS_device) from the RGB input. Here, the user cognitive characteristics (viewer CMF) may be the same as the creator CMF.

$$\begin{bmatrix} L_{ref} \\ M_{ref} \\ S_{ref} \end{bmatrix} = RGB2LMS_{ref} \begin{bmatrix} r_{in} \\ g_{in} \\ b_{in} \end{bmatrix} \qquad \text{[Equation 3]}$$

$$\begin{bmatrix} L_{dev} \\ M_{dev} \\ S_{dev} \end{bmatrix} = RGB2LMS_{device} \begin{bmatrix} r_{in} \\ g_{in} \\ b_{in} \end{bmatrix}$$

The calibration module 251 may identify the calibration value of the image characteristics based on a relationship, i.e., a difference between the reference data (LMS_ref) and the unique data (LMS_device) derived as above.

Specifically, the calibration module 251 may identify the calibration value of the image characteristics to transform the unique data (LMS_device) into the reference data (LMS-ref) for the content.

$$\begin{bmatrix} L_{ref} \\ M_{ref} \\ S_{ref} \end{bmatrix} = \qquad \text{[Equation 4]}$$

$$RGB2LMS_{device} \begin{bmatrix} r_{out} \\ g_{out} \\ b_{out} \end{bmatrix} = RGB2LMS_{device} * CAL * \begin{bmatrix} r_{in} \\ g_{in} \\ b_{in} \end{bmatrix}$$

Referring to the foregoing equation 4, the RGB input may be transformed into the RGB output by CAL.

Here, the reference data LMS_ref may be derived from the RGB output through the 3×3 matrix ($RGB2LMS_{device}$) derived from the equation 2.

Therefore, in the foregoing embodiment, the calibration value of the image characteristics is derived from the mathematical operation using the 3×3 matrix ($RGB2LMS_{device}$) that derives a user's unique data (LMS-_device) from the reference data (LMS_ref) and RGB input, and may, for example, be expressed in the form of a 3D LUT (CAL) (transform 3D LUT) that transforms the RGB input ($r_{in}$, $g_{in}$, $b_{in}$) into the RGB output for each color.

Meanwhile, according to an embodiment, when the creator CMF is used for the user cognitive characteristics, the calibration value of the image characteristics may be substantially identified based on a difference between the reference apparatus characteristics (reference SPD) and the apparatus characteristics (device SPD) of the second electronic apparatus 200.

Referring back to FIG. 9, the processor 250 may control the display 220 to display an image of content based on the calibration value of the image characteristics identified in the operation 903 (904). Here, the calibration module 251 may, as shown in FIG. 10, perform color calibration 1003 to calibrate and display an image based on the identified calibration value of the image characteristics.

The image subjected to the foregoing calibration is calibrated to meet the reference apparatus characteristics and the reference cognitive characteristics of a content creator, and therefore a user can view an image that meets an original author's creation intention.

According to an embodiment, the operations of the processor 250 may be implemented by a computer program stored in a computer program product (not shown) provided separately from the second electronic apparatus 200. In this case, the computer program product, for example, includes a memory in which an instruction(s) corresponding to the computer program is stored, and a processor. When executed by the processor 250, the instruction(s) performs control to identify the reference cognitive characteristics and reference display characteristics defined for content to be displayed, identify the apparatus characteristics of an electronic apparatus (the second electronic apparatus) and the user cognitive characteristics, identify the calibration value of the image characteristics based on relationships between the reference apparatus characteristics and reference cognitive characteristics and the apparatus characteristics and user cognitive characteristics of the electronic apparatus, and display an image of content based on the calibration value.

An embodiment in which the second electronic apparatus 200 calibrates and displays an image by identifying a user's unique cognitive characteristics will be described in more detail below.

Figure 14:
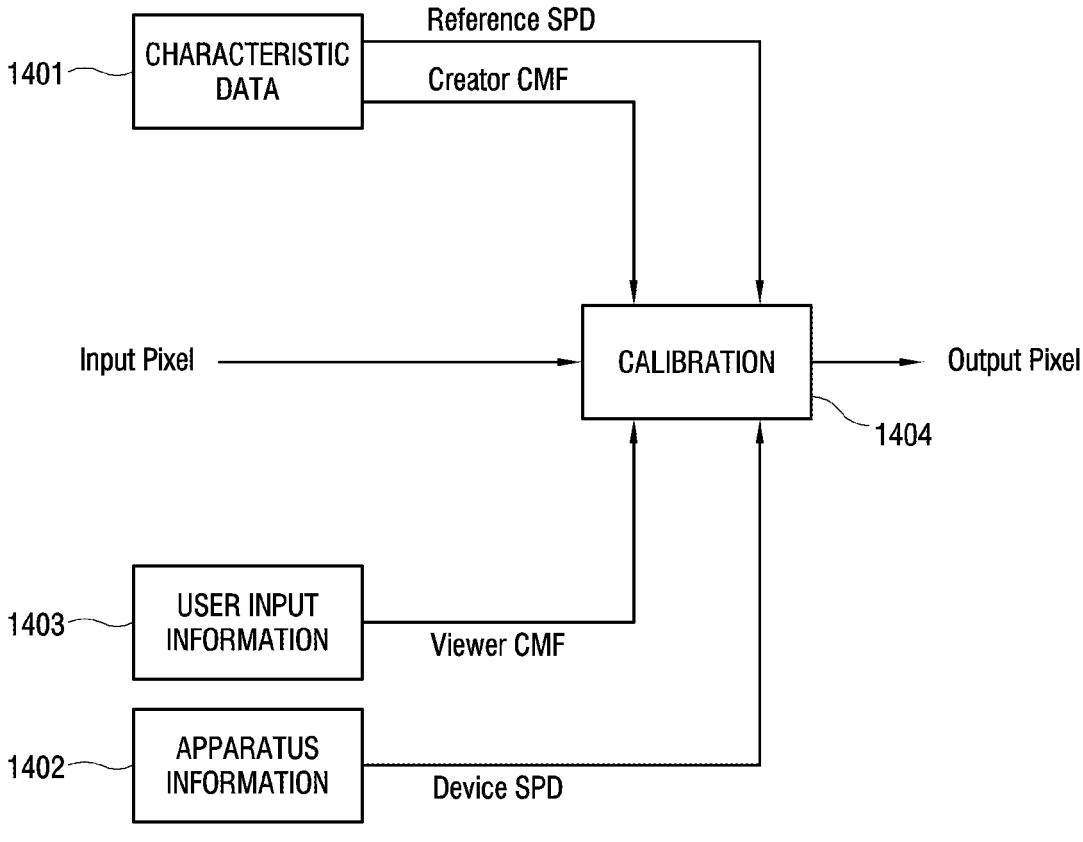
FIG. 14 illustrates another example of a control block diagram of a second electronic apparatus according to various embodiments.

FIG. 14 illustrates an example of a control block diagram of an example second electronic apparatus according to various embodiments.

As compared with the foregoing control block diagram of FIG. 10, the control block diagram of FIG. 14 is characterized in that the second electronic apparatus 200 derives actual unique cognitive characteristics of a user who is actually using the second electronic apparatus 200 in the apparatus itself to identify the user cognitive characteristics. Therefore, other operations except the identification of the user cognitive characteristics are the same as or similar to those in the embodiment of FIG. 10, and thus detailed descriptions thereof will not be repeated.

Figure 15:
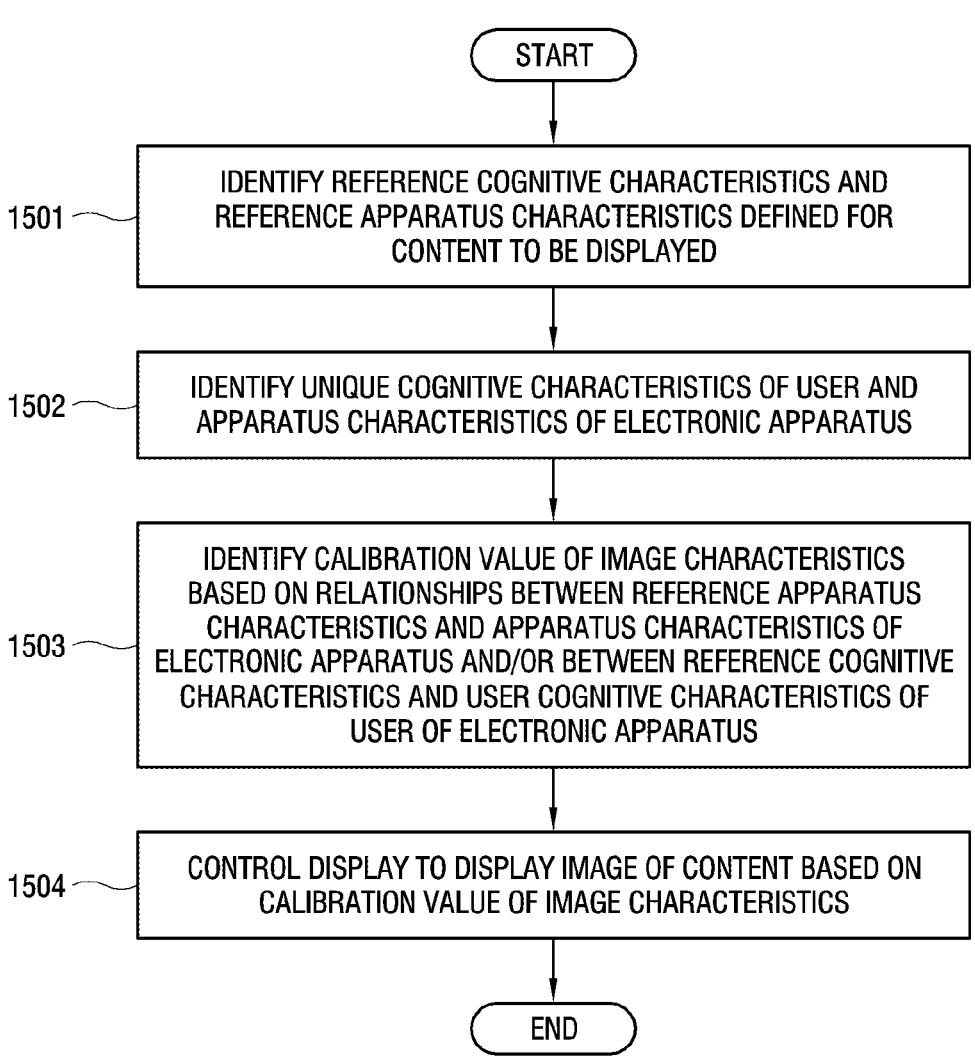
FIG. 15 is a flowchart showing example control operations based on control blocks shown in FIG. 14.

FIG. 15 is a flowchart showing example control operations based on control blocks shown in FIG. 14. As mentioned above, unlike an embodiment described with reference to FIG. 10, in this embodiment, the unique user cognitive characters of a user of the second electronic apparatus 200 are identified and used instead of directly using the reference cognitive characteristics as the user cognitive characteristics. The other operations are the same as or similar to those in the embodiment described above with reference to FIG. 9, and thus detailed descriptions thereof will not be repeated.

As shown in FIG. 15, the processor 250 of the second electronic apparatus 200 identifies the reference cognitive characteristics and reference apparatus characteristics defined for content to be displayed on the display 220 (1501).

Referring to FIG. 14, the processor 250 may identify the reference apparatus characteristics (reference SPD) and the reference cognitive characteristics (creator CMF) by parsing the characteristic data 1401 received from the first electronic apparatus 100.

Next, the processor 250 identifies the unique cognitive characteristics of a user who is actually using the second electronic apparatus 200 and the apparatus characteristics of the electronic apparatus (1502). Here, the configurations related to the apparatus characteristics of the second electronic apparatus 200 are the same as or similar to those in the embodiment described with reference to FIG. 10.

For example, as shown in FIG. 14, the processor 250 may identify the device SPD of the second electronic apparatus 200, which is read from apparatus information 1402 previously stored in the storage 230, as the apparatus characteristics.

Regarding the identification of the user cognitive characteristics (unique characteristics) of the second electronic apparatus 200, descriptions will be made with reference to FIG. 16.

Figure 16:
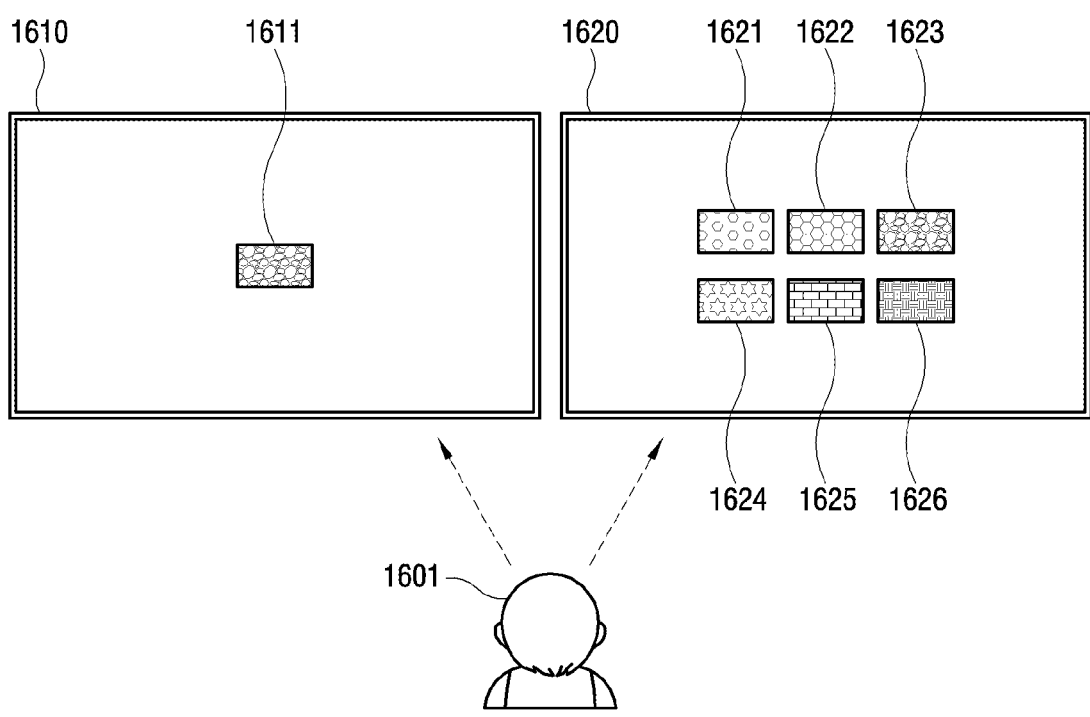
FIG. 16 illustrates an example of identifying user cognitive characteristics according to various embodiments.

FIG. 16 illustrates an example of identifying user cognitive characteristics according to various embodiments.

As shown in FIG. 16, the processor 250 may perform control to display images 1611 and 1621 to 1626 for measurement on two displays 1610 and 1620. Here, the images for the measurement will be referred to, for example, as second images to be distinguished from the first image, e.g., the image of content.

The two displays 1610 and 1620 may be variously implemented, and, for example, one of them, e.g., the display 1610 (hereinafter referred to as a 'first display') may be included in the second electronic apparatus 200. In this case, the other display, e.g., the display 1620 (hereinafter referred to as a 'second display') may be provided in another external apparatus. Of course, this is merely an example, and both the displays 1610 and 1620 may be provided in the external apparatuses other than the second electronic apparatus 200. However, in this case, the second electronic apparatus 200 communicates with the external apparatuses including the two displays 1610 and 1620 so that the second images 1611 and 1621 to 1626 (hereinafter referred to as measurement images) can be displayed on the two displays 1610 and 1620. In this embodiment, it will be assumed that the first display 1610 is provided in the second electronic apparatus 200, and the second display 1620 is provided in a user device, for example, a mobile phone, etc. Further, it will be assumed that the first display 1610 and the second display 1620 are different in SPD from each other. Information about each SPD of the first display 1610 and the second display 1620 may be previously stored in each of the apparatus provided with the first display 1610 or the apparatus provided with the second display 1620, or the processor 250 may request and obtain the information about each SPD of the first display 1610 and the second display 1620 from other external apparatuses.

The processor 250 obtains user cognitive feedback information with respect to the measurement images 1611 and 1621 to 1626 respectively displayed on the first display 1610 and the second display 1620 different in the SPD from each other, and identifies the user cognitive characteristics of the second electronic apparatus 200 based on the obtained user cognitive feedback information. In other words, even though the measurement images 1611 and 1621 to 1626 are the same as each other, the measurement image 1611 displayed on the first display 1610 and the measurement images 1621 to 1626 displayed on the second display 1620 may be perceived to have different image characteristics by a user 1601 who is viewing the measurement images 1611 and 1621 to 1626 respectively displayed on the first display 1610 and the second display 1620 different in the SPD from each other.

Based on this principle, the processor 250 identifies the user cognitive characteristics based on the user cognitive feedback information about the measurement images 1611 and 1621 to 1626 respectively displayed on the first display 1610 and the second display 1620. For example, the processor 250 controls the first display 1610 to display the first measurement image 1611, and controls the second display 1620 to display the plurality of second measurement images 1621 to 1626 slightly different in image characteristics, e.g., color, from the first measurement image 1611. Under this condition, the processor 250 obtains user feedback information that one second measurement image 1623 perceived to be most similar to the first measurement image 1611 is selected by the user 1601 among the plurality of second measurement images 1621 to 1626, and identifies the user cognitive characteristics based on the difference in the image characteristics between the first measurement image 1611 and the selected second measurement image 1623. In this case, the processor 250 may perform a guide operation of displaying a guide message so that the user 1601 can easily give the feedback information.

Here, when the user cognitive characteristics are identified based on the difference in the image characteristics between the first measurement image 1611 and the selected second measurement image 1621 to 1626, the user cognitive characteristics may be derived based on the foregoing relationship among the apparatus characteristics, the cognitive characteristics, and the image characteristics.

In other words, it may be understood that the image characteristics are obtained by multiplying the apparatus characteristics and the cognitive characteristics, and therefore the cognitive characteristics are derived when the apparatus characteristics and the image characteristics are given. In this embodiment, the difference in the SPD between the two displays 1610 and 1620 is given as mentioned above, and the difference in the image characteristics between the first measurement image 1611 and the selected second measurement image 1621 to 1626 is given based on the user cognitive feedback information. Therefore, the processor 250 may derive the user cognitive characteristics based on the difference in the SPD and the difference in the image characteristics between the first measurement image 1611 and the second measurement image 1621 to 1626, based on equation 1 described in the foregoing embodiment of FIG. 9.

The identification of the user cognitive characteristics according to an embodiment is not limited to the example described above, but may be variously implemented. For example, the foregoing embodiment shows that one second measurement image perceived to be most similar to the first measurement image 1611 is selected by the user 1601 among the plurality of given second measurement images 1621 to 1626, but, in an embodiment, the user 1601 may slightly adjust the characteristics of a single second measurement image being displayed until the second measurement image is perceived to be most similar to the first measurement image 1611, and select the adjusted second measurement image.

In this way, unlike the foregoing embodiment (FIG. 10) in which the user cognitive characteristics are identically used as the reference cognitive characteristics, the user cognitive characteristics according to this embodiment are identified based on the information obtained by accurately measuring the unique cognitive characteristics of the present user 1601, thereby more reliably displaying an image and being more convenient for the present user 1601.

In an embodiment, the identification of the user cognitive characteristics may be simpler than the foregoing identification of the user cognitive characteristics based on the measurement. Specifically, in the identification of the user cognitive characteristics according to an embodiment, a plurality of different predefined user cognitive characteristics is prepared. The plurality of user cognitive characteristics may, for example, be defined by taking the cognitive characteristics of multiple users into account. Specifically, the cognitive characteristics of the multiple users are classified into a plurality of groups according to a plurality of users who are identified to have a similar tendency to perceive an image, and the plurality of cognitive characteristics are assigned and defined based on common cognitive characteristics of the users who belong to each group according to the groups. The plurality of users identified to have the common cognitive characteristics may be grouped based on, for example, age, preferred viewing distance, color weakness, etc.

The processor 250 obtains information about the plurality of user cognitive characteristics classified into the plurality of groups, identifies which group a user of the second electronic apparatus 200 belongs to among the plurality of groups, and identifies the user cognitive characteristics of the identified group to which the user belongs among the plurality of user cognitive characteristics as the user cognitive characteristics of the user who is using the second electronic apparatus 200. The processor 250 may identify a group, to which the user of the second electronic apparatus 200 belongs, among the plurality of groups, based on a user's personal information. Like the information for classifying the plurality of groups, the user's personal information may, for example, include a user's age, preferred viewing distance, color weakness, and the like information. The processor 250 may obtain the user's personal information a user's personal information in various ways. For example, the processor 250 may obtain a user's personal information based on a user's input received through the interface 210 shown in FIG. 8, or may obtain a user's personal information by making a request to a server that manages the user's account or the like. In this case, the processor 250 may perform a guide operation of displaying a guide message to receive a user's input about his/her personal information.

Referring back to FIG. 14, the processor 250 may identify a user's unique cognitive characteristics (viewer CMF) as the user cognitive characteristics, based on user input information 1403 received in various ways as described above.

Meanwhile, referring back to FIG. 15, the processor 250 identifies the calibration value of the image characteristics based on relationships between reference apparatus characteristics and apparatus characteristics of the electronic device and/or between the reference cognitive characteristics and the reference cognitive characteristics of a user who is using the second electronic apparatus 200 (1503).

The configurations for identifying the calibration value of the image characteristics based on the difference between the reference apparatus characteristics and the apparatus characteristics of the second electronic apparatus 200 are the same as or similar to those in the various embodiments described with reference to FIGS. 9 to 16.

The processor 250 identifies the calibration value of the image characteristics based on the difference between the reference cognitive characteristics and the reference cognitive characteristics of a user who is using the second electronic apparatus 200 further considered in addition to the difference between the reference apparatus characteristics and the apparatus characteristics of the second electronic apparatus 200.

In other words, the processor 250 may identify the calibration value of the image characteristics through the mapping process using the 3D LUT 1301 or the mathematical operations using the 3×3 matrix.

Next, the processor 250 controls the display to display an image of content based on the calibration value of the identified image characteristics (804). The configurations for controlling the display to display the image of the content based on the calibration value of the image characteristics are the same as or similar to those described in the embodiment with reference to FIG. 14.

In other words, the calibration module 251 of the processor 250 may, as shown in FIG. 14, perform color calibration 1404 to calibrate and display an image based on the calibration value of the identified image characteristics.

Accordingly, the processor 150 of the second electronic apparatus 200 may perform the operations of the foregoing instruction(s) by downloading and executing a computer program stored in a separate computer program product.

According to an example embodiment, methods according to various embodiments of the disclosure may be provided as a computer program product. The computer program product may be traded as a product between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of online distribution, at least part of the computer program product (e.g., a downloadable app) may be transitorily stored or temporarily produced in a machine-readable storage medium such as a memory of a manufacturer server, an application-store server, or a relay server.

Although example embodiments of the disclosure have been described in detail, various changes may be made in these example embodiments without departing from the scope defined in the appended claims.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus, comprising:
memory; and
at least one processor comprising processing circuitry,
wherein the memory stores instructions which, when executed by the at least one processor individually or collectively, cause the electronic apparatus to perform operations comprising:
obtaining, from an external apparatus, content and characteristic data generated based on reference apparatus characteristics and reference cognitive characteristics defined for the content, the reference apparatus characteristics comprising a reference spectral power distribution (SPD) of a display used to create the content, the reference cognitive characteristics comprising a reference color matching function (CMF) representing color cognitive characteristics of a content creator, and the characteristic data comprising a value obtained by an operation for mathematically combining sampled values of the reference SPD and sampled values of the reference CMF;
identifying the reference apparatus characteristics and the reference cognitive characteristics from the characteristic data by performing an inverse of the operation for mathematically combining the sampled values of the reference SPD and the sampled values of the reference CMF;

identifying apparatus characteristics of the electronic apparatus and user cognitive characteristics, the apparatus characteristics comprising a unique SPD of a display of the electronic apparatus and the user cognitive characteristics comprising a unique CMF representing color cognitive characteristics of a user; and
controlling the display to display an image of the content based on a calibration value of image characteristics based on a first relationship between the reference SPD and the unique SPD and a second relationship between the reference CMF and the unique CMF,
wherein the at least one processor is configured to display the image of the content by transforming sampled values of an RGB input of the image of the content into values of an RGB output based on the calibration value, and transforming unsampled values of the RGB input into the values of an RGB output based on interpolation.

2. The electronic apparatus of claim 1, wherein the instructions, when executed by the at least one processor individually or collectively, cause the electronic apparatus to perform operations comprising identifying the calibration value of the image characteristics based on a difference between the reference apparatus characteristics and the apparatus characteristics of the electronic apparatus.

3. The electronic apparatus of claim 1, wherein the instructions, when executed by the at least one processor individually or collectively, cause the electronic apparatus to perform operations comprising identifying the user cognitive characteristics to be the same as the reference cognitive characteristics.

4. The electronic apparatus of claim 1, wherein the instructions, when executed by the at least one processor individually or collectively, cause the electronic apparatus to perform operations comprising:
identifying the user cognitive characteristics to be different from the reference cognitive characteristics; and
identifying the calibration value of the image characteristics based on a difference between the reference cognitive characteristics and the user cognitive characteristics.

5. The electronic apparatus of claim 4, wherein the instructions, when executed by the at least one processor individually or collectively, cause the electronic apparatus to perform operations comprising:
displaying a second image on each of a first display and a second display; and
identifying the user cognitive characteristics based on apparatus characteristics of the first and second displays and user cognitive feedback information about the second image.

6. The electronic apparatus of claim 4, wherein the instructions, when executed by the at least one processor individually or collectively, cause the electronic apparatus to perform operations comprising identifying user cognitive characteristics corresponding to a user who is using the electronic apparatus among a plurality of user cognitive characteristics grouped based on cognitive characteristics of a plurality of users.

7. The electronic apparatus of claim 6, wherein the instructions, when executed by the at least one processor individually or collectively, cause the electronic apparatus to perform operations comprising:
obtaining personal information of the user; and identifying user cognitive characteristics corresponding to the user based on the obtained personal information.

8. The electronic apparatus of claim 1, wherein the instructions, when executed by the at least one processor individually or collectively, cause the electronic apparatus to perform operations comprising deriving the calibration value of image characteristics to transform unique data corresponding to the apparatus characteristics and the user cognitive characteristics of the electronic apparatus into reference data corresponding to the reference apparatus characteristics and the reference cognitive characteristics.

9. A method of controlling an electronic apparatus, the method comprising:

obtaining, from an external apparatus, content and characteristic data generated based on reference apparatus characteristics and reference cognitive characteristics defined for the content, the reference apparatus characteristics comprising a reference spectral power distribution (SPD) of a display used to create the content, the reference cognitive characteristics comprising a reference color matching function (CMF) representing color cognitive characteristics of a content creator, and the characteristic data comprising a value obtained by an operation for mathematically combining sampled values of the reference SPD and sampled values of the reference CMF;

identifying the reference apparatus characteristics and the reference cognitive characteristics from the characteristic data by performing an inverse of the operation for mathematically combining the sampled value of the reference SPD and the sampled values of the reference CMF;

identifying apparatus characteristics of the electronic apparatus and user cognitive characteristics, the apparatus characteristics comprising a unique SPD of a display of the electronic apparatus and the user cognitive characteristics comprising a unique CMF representing color cognitive characteristics of a user; and controlling the display to display an image of the content based on a calibration value of image characteristics based on a first relationship between the reference SPD and the unique SPD and a second relationship between the reference CMF and the unique CMF, wherein the method further comprises displaying the image of the content by transforming sampled values of an RGB input of the image of the content into values of an RGB output based on the calibration value, and transforming unsampled values of the RGB input into the values of an RGB output based on interpolation.

10. The method of claim 9, further comprising identifying the calibration value of the image characteristics based on a difference between the reference apparatus characteristics and the apparatus characteristics of the electronic apparatus.

11. The method of claim 9, wherein the identifying of the user cognitive characteristics comprises identifying the user cognitive characteristics to be the same as the reference cognitive characteristics.

12. The method of claim 9, wherein the identifying of the user cognitive characteristics comprises identifying the user cognitive characteristics to be different from the reference cognitive characteristics; and the method further comprises identifying the calibration value of the image characteristics based on a difference between the reference cognitive characteristics and the user cognitive characteristics.

13. The method of claim 12, wherein the identifying of the user cognitive characteristics comprises:

displaying a second image on each of a first display and a second display; and identifying the user cognitive characteristics based on apparatus characteristics of the first and second displays and user cognitive feedback information about the second image.

14. The method of claim 12, wherein the identifying of the user cognitive characteristics comprises identifying user cognitive characteristics corresponding to a user who is using the electronic apparatus among a plurality of user cognitive characteristics grouped based on cognitive characteristics of a plurality of users.

15. The method of claim 9, further comprising deriving the calibration value of image characteristics to transform unique data corresponding to the apparatus characteristics of the electronic apparatus and the user cognitive characteristics into reference data corresponding to the reference apparatus characteristics and the reference cognitive characteristics.

16. A non-transitory computer-readable storage medium storing instructions which, when executed by at least one processor of an electronic apparatus, cause the electronic apparatus to perform operations comprising:

obtaining, from an external apparatus, content and characteristic data generated based on reference apparatus characteristics and reference cognitive characteristics defined for the content, the reference apparatus characteristics comprising a reference spectral power distribution (SPD) of a display used to create the content, the reference cognitive characteristics comprising a reference color matching function (CMF) representing color cognitive characteristics of a content creator, and the characteristic data comprising a value obtained by an operation for mathematically combining sampled values of the reference SPD and sampled values of the reference CMF;

identifying the reference apparatus characteristics and the reference cognitive characteristics from the characteristic data by performing an inverse of the operation for mathematically combining the sampled value of the reference SPD and the sampled values of the reference CMF;

identifying apparatus characteristics of the electronic apparatus and user cognitive characteristics, the apparatus characteristics comprising a unique SPD of a display of the electronic apparatus and the user cognitive characteristics comprising a unique CMF representing color cognitive characteristics of a user; and controlling the display to display an image of the content based on a calibration value of image characteristics based on a first relationship between the reference SPD and the unique SPD and a second relationship between the reference CMF and the unique CMF, wherein the operations further comprise displaying the image of the content by transforming sampled values of an RGB input of the image of the content into values of an RGB output based on the calibration value, and transforming unsampled values of the RGB input into the values of an RGB output based on interpolation.

* * * * *